United States Patent
Davydov et al.

(10) Patent No.: US 10,530,503 B2
(45) Date of Patent: Jan. 7, 2020

(54) APPARATUS AND METHOD FOR RSRP MEASUREMENT AND ALLOCATION OF DOWNLINK TRANSMISSION RESOURCES

(71) Applicant: Intel IP Corporation, Santa Clara, CA (US)

(72) Inventors: Alexei Davydov, Nizhny Novgorod (RU); Seunghee Han, San Jose, CA (US); Debdeep Chatterjee, San Jose, CA (US); Gregory Morozov, Nizhny Novgorod (RU); Dae Won Lee, Portland, OR (US); Yongjun Kwak, Portland, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/128,111

(22) Filed: Sep. 11, 2018

(65) Prior Publication Data
US 2019/0044631 A1   Feb. 7, 2019

Related U.S. Application Data

(60) Provisional application No. 62/556,933, filed on Sep. 11, 2017, provisional application No. 62/567,202, filed on Oct. 2, 2017, provisional application No. 62/570,004, filed on Oct. 9, 2017.

(51) Int. Cl.
| | |
|---|---|
| *H04B 17/318* | (2015.01) |
| *H04W 72/04* | (2009.01) |
| *H04B 7/08* | (2006.01) |
| *H04W 24/08* | (2009.01) |
| *H04L 5/00* | (2006.01) |
| *H04B 7/06* | (2006.01) |

(52) U.S. Cl.
CPC ......... *H04B 17/318* (2015.01); *H04B 7/0802* (2013.01); *H04L 5/0051* (2013.01); *H04W 24/08* (2013.01); *H04W 72/042* (2013.01); *H04W 72/046* (2013.01); *H04B 7/0626* (2013.01)

(58) Field of Classification Search
CPC .. H04B 17/318; H04B 7/0626; H04B 7/0802; H04L 5/0051; H04W 24/08; H04W 72/042; H04W 72/049
See application file for complete search history.

(56) References Cited

U.S. PATENT DOCUMENTS

| | | | | |
|---|---|---|---|---|
| 2011/0105119 | A1* | 5/2011 | Bienas | H04W 36/0055 455/436 |
| 2014/0226519 | A1* | 8/2014 | Nagata | H04J 11/0053 370/252 |
| 2017/0012692 | A1* | 1/2017 | Kim | H04B 7/0695 |

OTHER PUBLICATIONS

3GPP TSG RAN WG1 Meeting AH_NR#3 R1-1715368, (Sep. 2017), 1 pg.

* cited by examiner

*Primary Examiner* — Janice N Tieu
(74) *Attorney, Agent, or Firm* — Kowert, Hood, Munyon, Rankin & Goetzel, P.C.

(57) ABSTRACT

Embodiments of the present disclosure describe apparatuses, methods and machine-readable storage medium for Reference Signal Received Power (RSRP) measurement and allocation of Downlink (DL) transmission resources.

8 Claims, 16 Drawing Sheets

APPARATUS AND METHOD FOR RSRP MEASUREMENT AND ALLOCATION OF DOWNLINK TRANSMISSION RESOURCES

CROSS REFERENCES TO RELATED APPLICATIONS

This application claims the benefit of priority under 35 U.S.C. § 119(e) to U.S. Provisional Application No. 62/556,933 filed Sep. 11, 2017, U.S. Provisional Application No. 62/567,202 filed Oct. 2, 2017 and U.S. Provisional Application No. 62/570,004 filed Oct. 9, 2017, which are hereby incorporated by reference in their entirety.

FIELD

Embodiments of the present disclosure generally relate to the field of wireless communication, and more particularly to an apparatus and a method for Reference Signal Received Power (RSRP) measurement and allocation of Downlink (DL) transmission resources.

BACKGROUND

In New Radio (NR) systems, especially a NR system deployed to operate above 6 GHz, not only transmit (TX) beamforming but also receive (RX) beamforming will play a crucial role, e.g., due to specific features of a signal propagation mechanism associated with such systems. In case of using multiple RX beams at the UE side, how to measure and report a Reference Signal Received Power (RSRP) in order to support mobility in the NR system becomes a challenging task.

On the other hand, in current NR systems, the only Downlink (DL) resources, which UE knows for sure, are 4 OFDM symbols allocated to a detected Synchronization Signal/Physical Broadcast Channel (SS/PBCH) block. Multiple candidate SS/PBCH blocks can be transmitted in a NR network. Potentially, the UE can use them for DL measurements if provided with information about all SS/PBCH blocks actually transmitted by an Access Node (AN). According to related 3GPP technical specifications, in the NR network, this information is a part of the Remaining Minimal System Information (RMSI) (also referred to as System Information Block 1 (SIB1)). In order to read the RMSI to know the actually transmitted SS/PBCH blocks, the UE may decode sequentially a Physical Broadcast Channel (PBCH), DL control and data channels.

BRIEF DESCRIPTION OF THE DRAWINGS

Embodiments of the disclosure will be illustrated, by way of example and not limitation, in the figures of the accompanying drawings in which like reference numerals refer to similar elements.

DETAILED DESCRIPTION OF EMBODIMENTS

Various aspects of the illustrative embodiments will be described using terms commonly employed by those skilled in the art to convey the substance of their work to others skilled in the art. However, it will be apparent to those skilled in the art that many alternate embodiments may be practiced using portions of the described aspects. For purposes of explanation, specific numbers, materials, and configurations are set forth in order to provide a thorough understanding of the illustrative embodiments. However, it will be apparent to those skilled in the art that alternate embodiments may be practiced without the specific details. In other instances, well known features may have been omitted or simplified in order to avoid obscuring the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in an embodiment" is used repeatedly herein. The phrase generally does not refer to the same embodiment; however, it may. The terms "comprising," "having," and "including" are synonymous, unless the context dictates otherwise. The phrases "A or B" and "A/B" mean "(A), (B), or (A and B)."

In the NR system, multiple RX beams created by analogue, digital or hybrid RX beamforming may be employed at UE to receive DL transmission from an Access Node (AN). Accordingly, when performing the RSRP measurement and reporting to support mobility in the NR network, the UE may measure RSRP values for multiple candidate channels each of which corresponds to a respective RX beam, based on a Reference Signal (RS) including a Synchronization Signal (SS), a SS together with a Physical Broadcasting Channel (PBCH), a Channel-State Information Reference Signal (CSI-RS) or a Demodulation Reference Signal (DM-RS), and select a RSRP value out of the measured RSRP values for reporting to the AN.

In a 3GPP technical report: R1-1715368 (R4-1709017) "LS on RSRP Measurements for Mobility in NR", Ericsson, 3GPP TSG RAN WG1 Meeting AH_NR#3, Nagoya, Japan, 18th-21st, Sep. 2017, it was proposed to define the RSRP measurement in such a way that the reported RSRP value shall not be lower than the corresponding RSRP of any of the individual branches. The RSRP definition itself assumes that the measurements are performed on the combined signal. In case of using multiple RX beams at the UE, it means the UE should measure the RSRP for all of its RX beams in order to select the best one with the highest RSRP for further reporting.

Figure 1:
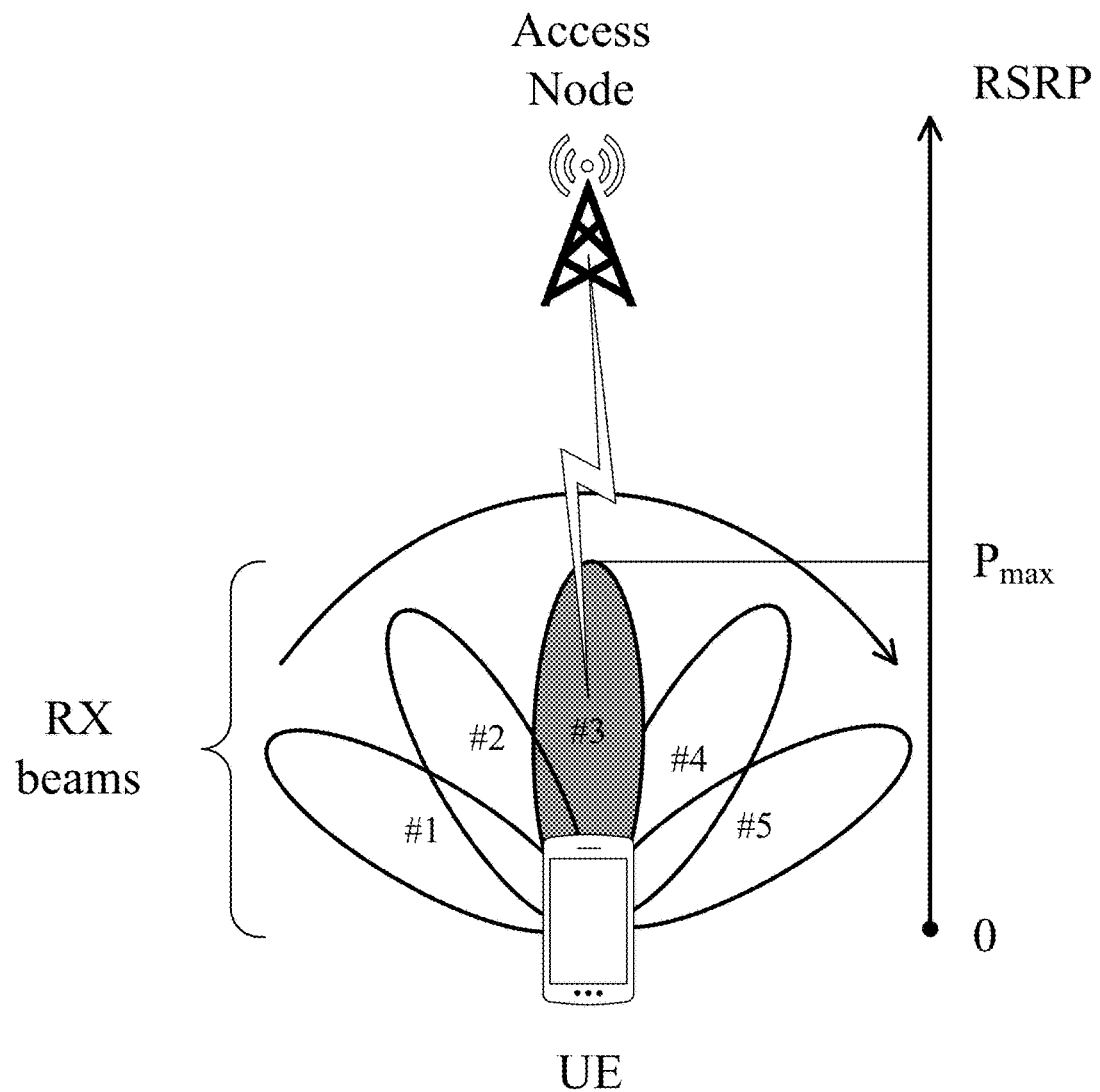
FIG. 1 shows an example scenario for RSRP measurement at UE according to a proposed RSRP measurement procedure.

FIG. 1 shows an example scenario for RSRP measurement at UE according to the proposed solution. As illustrated in the figure, the UE with multiple RX beams measures the RSRP per each RX beam and selects the RX beam #3 with the highest RSRP $P_{max}$ to report to the AN.

In this example, the UE may take a long time to measure the RSRP per each of its RX beams, especially when the number of RX beams is large. For example, a NR-enabled autonomous car can be a UE with the number of RX beams that is equal to the number of TX beams usually used at the AN, e.g., up to 64. This becomes more crucial when the RSRP is also to be measured for the number of TX beams used at the AN.

A RSRP measurement procedure which allows to speed up the measurement is proposed according to some embodiments of the present disclosure. In particular, the UE may compare the RSRP measured per a particular RX beam with a RSRP threshold. As soon as the measured RSRP is above the RSRP threshold, the UE may terminate the RSRP measurement procedure, and report the measured RSRP to the AN. According to some embodiments, the RSRP threshold can be signaled to the UE from the AN, or predefined in the NR specification to be known by the UE.

Figure 2:
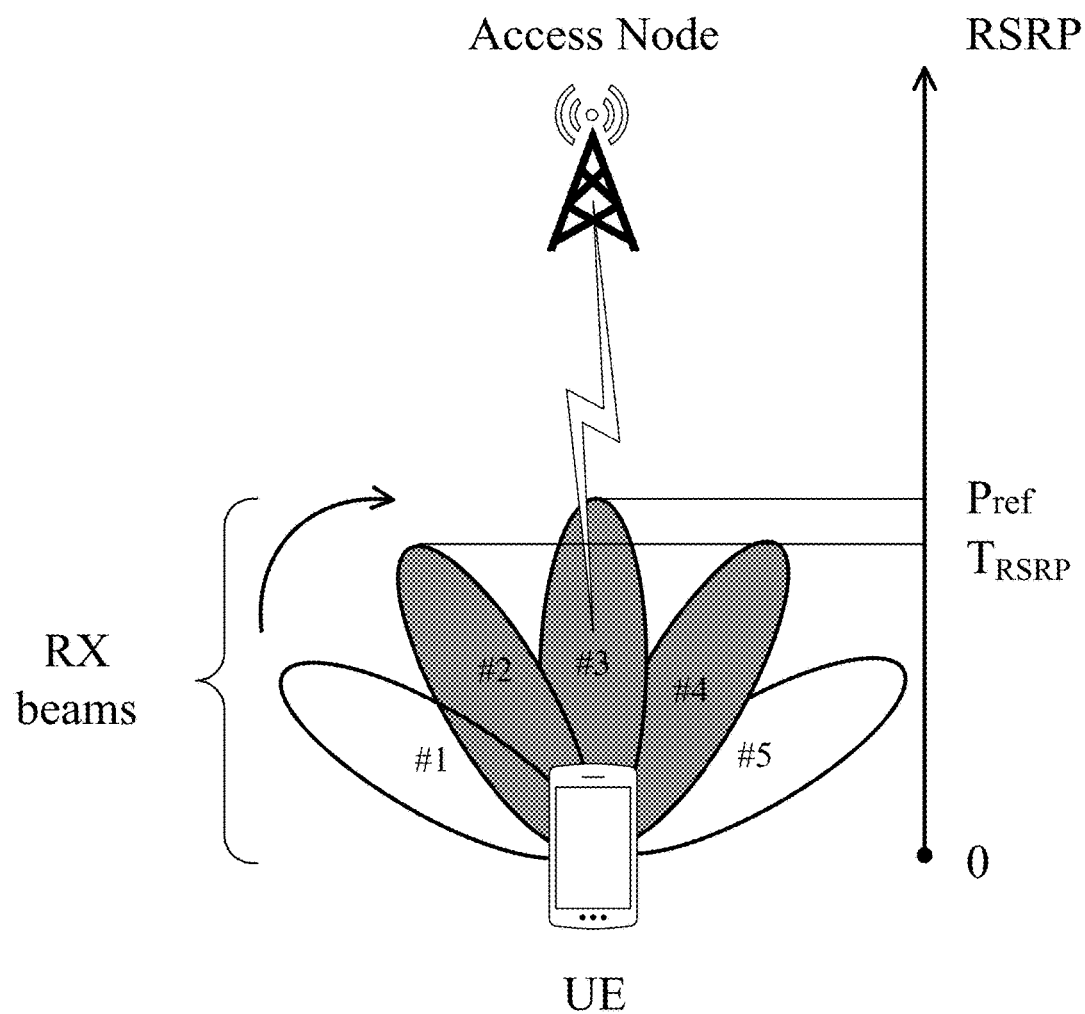
FIG. 2 shows an example scenario for RSRP measurement at UE in accordance with some embodiments of the present disclosure.

FIG. 2 shows an example scenario for RSRP measurement at the UE in accordance with some embodiments of the present disclosure.

Assuming the RSRP measurement procedure is performed for the RX beams sequentially according to predefined indexes of the RX beams, as shown in FIG. 2, the first RX beam which corresponding RSRP is higher than the RSRP threshold $T_{RSRP}$ is RX beam #2. As a result, the UE may terminate the RSRP measurement procedure once obtaining the measured RSRP for RX beam #2. In other words, the UE will not make further measurement for the remaining RX beams. The proposed RSRP measurement procedure allows the UE to avoid exhaustive measurements for all of its RX beams. This potentially reduces the time the UE with multiple RX beams spends for RSRP measurements.

Alternatively, the UE may report a measured RSRP value corresponding to a specific RX beam as long as the measured RSRP value is within a predefined margin threshold from a reference RSRP value. The reference RSRP value may be the highest RSRP value measured from all RX beams. For example, if the UE knows that a specific RX beam will likely correspond to one of the highest RSRP values among all RX beams and if the RSRP measured for the specific RX beam will be within the margin threshold from the highest RSRP value, then the UE may simply report the measured RSRP without further measuring the RSRP for the rest of the RX beams. This will allow the UE to skip measurements for some RX beams and can also speed up the RSRP measurement procedure.

Figure 3:
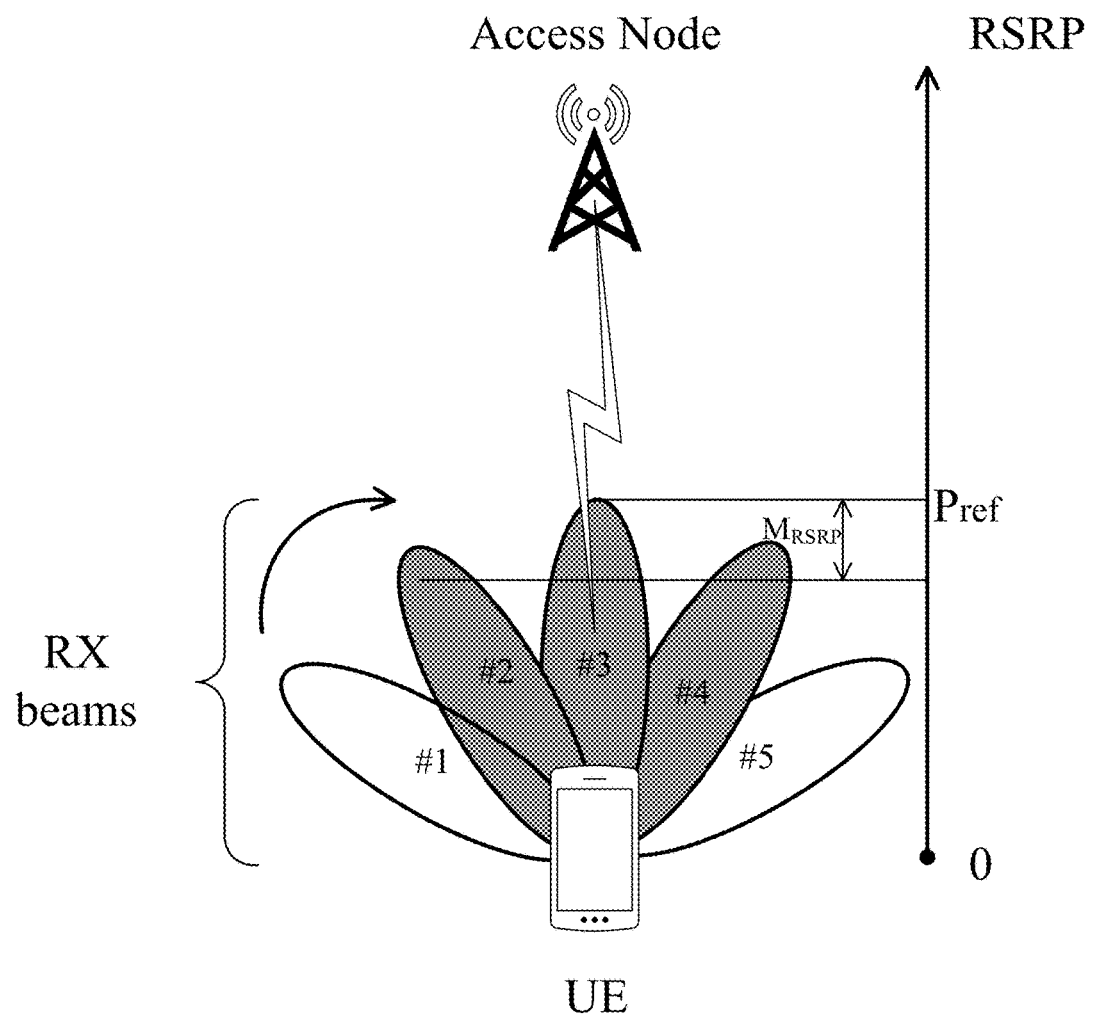
FIG. 3 shows another example scenario for RSRP measurement at UE in accordance with some embodiments of the present disclosure.

FIG. 3 shows another example scenario for RSRP measurement at the UE side in accordance with some embodiments of the present disclosure. As illustrated, the UE may report any of RX beam #2, RX beam #3 and RX beam #4, since the margin between the RSRP value measured for any of RX beam #2, RX beam #3 and RX beam #4 and the reference RSRP value $P_{ref}$ is less than the predefined RSRP margin threshold $M_{RSRP}$.

In an embodiment, the reference RSRP value $P_{ref}$ can be obtained by performing RSRP measurement for all RX beams and selecting the highest RSRP value as the reference RSRP value for follow-up RSRP measurements. Especially at the beginning of UE operations, there may be no any previous measurements. In this case, the UE may measure RSRP values for all RX beams, determine the highest RSRP value among the measured RSRP values, report the highest RSRP value to the AN and meanwhile set the determined highest RSRP value to be the reference RSRP value for follow-up RSRP measurements.

Alternatively, when the UE has performed some previous RSRP measurements, the RSRP value from the UE's prior report can be used as the reference RSRP value for follow-up RSRP measurements. Based on that, the current RSRP value to be reported by the UE shall not be lower than the reference RSRP value determined from the RSRP value reported previously. Otherwise, in situations where there are no any previous measurements or a margin between each of the measured RSRP values and the reference RSRP value is larger than the predefined RSRP margin threshold, the highest RSRP value among the RSRP values measured for all RX beams, e.g., obtained via scanning all RX beams as in FIG. 1, should be reported to the AN.

According to some embodiments described referring to FIG. 2, the RSRP threshold can be signaled to the UE from the AN, or predefined in the NR specification to be known by the UE.

Alternatively, according to some other embodiments, the UE can calculate and update the RSRP threshold by itself. In particular, the UE can firstly determine a reference RSRP value for the RSRP measurement procedure and then obtain the RSRP threshold (e.g., $T_{RSRP}$ in FIG. 2) by subtracting a predefined RSRP margin threshold from the reference RSRP value. For example, given the reference RSRP value $P_{ref}$ and the predefined RSRP margin threshold $\Delta$, the RSRP threshold can be obtained by $T_{RSRP}=P_{ref}-\Delta$ (dB).

Similar to the above embodiments described referring to FIG. 3, the reference RSRP value $P_{ref}$ can be obtained by performing RSRP measurement for all RX beams and selecting the highest RSRP value as the reference RSRP value for follow-up RSRP measurements, especially at the beginning of UE operations when there are no any previous measurements. With the reference RSRP value, the RSRP threshold can be calculated and saved for follow-up RSRP measurements.

On the other hand, when the UE has performed some previous RSRP measurements, the UE can determine the RSRP threshold $T_{RSRP}$ by using the RSRP value from the UE's prior report as the reference RSRP value. Based on that, the UE can terminate the RSRP measurement procedure and report the RSRP value measured for a specific RX beam to the AN, once the RSRP value measured for the specific RX beam is higher than the determined RSRP threshold $T_{RSRP}$. Otherwise, in situations where there are no threshold value available to the UE or the measured RSRP values for all RX beams are lower than the determined RSRP threshold $T_{RSRP}$, the highest RSRP value among the RSRP values measured for all RX beams, e.g., obtained via scanning all RX beams as in FIG. 1, should be reported to the AN.

Additionally, according to some embodiments, each time the UE completes a RSRP measurement procedure and reports a measured RSRP value to the AN, the UE can take the latest RSRP value reported by the UE as the reference RSRP value $P_{ref}$ to determine an updated RSRP threshold $T_{RSRP}$ to be applied for follow-up RSRP measurements. That is, the RSRP threshold can be updated as: $T_{RSRP}=P_{ref}-\Delta$ (dB).

Figure 4:
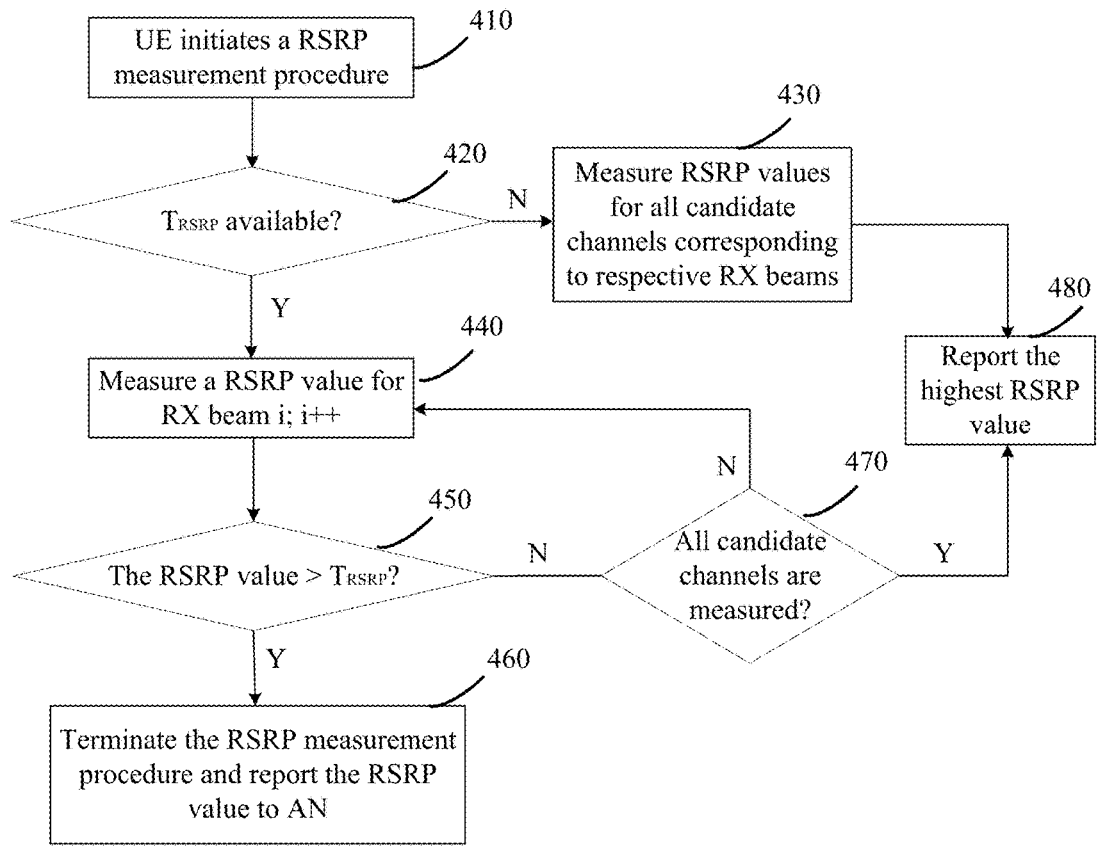
FIG. 4 shows a flow chart illustrating a method for implementing a quick RSRP measurement procedure at UE in accordance with some embodiments of the present disclosure.

FIG. 4 shows a flow chart illustrating a method for implementing a quick RSRP measurement procedure at UE in accordance with some embodiments of the present disclosure.

In block 410, the UE may initiate a measurement procedure to measure a RSRP value for each of one or more candidate channels between the UE and the AN, wherein each candidate channel corresponds to a respective RX beam from the UE. In block 420, the UE may determine whether a predetermined RSRP threshold $T_{RSRP}$ is available to the UE. If no predetermined RSRP threshold $T_{RSRP}$ is available to the UE, the UE may measure RSRP values for all candidate channels between the UE and the AN in block 430 and report a highest RSRP value among the measured RSRP values to the AN in block 480. That is, the UE may measure RSRP values for all candidate channels corresponding to all respective RX beams and report the highest RSRP value, as illustrated in FIG. 1.

If the UE has a predetermined RSRP threshold $T_{RSRP}$ available for the RSRP measurement, the UE may measure a RSRP value for a specific candidate channel in block 440 and compare the measured RSRP value with the RSRP threshold $T_{RSRP}$ in block 450. When the RSRP value measured for the specific candidate channel is higher than the RSRP threshold $T_{RSRP}$, the UE may terminate the measurement procedure and report the RSRP value measured for the specific candidate channel to the AN in block 460. Otherwise, the UE may continue to measure a RSRP value for a next candidate channel in block 440. If no RSRP value is higher than the RSRP threshold $T_{RSRP}$ when RSRP values for all candidate channels have been measured ('Y' in block 470), the UE may report the highest RSRP value among all the measured RSRP values in block 480. It is noted that in block 440, an index of a RX beam is denoted by i, and the UE may measure the RSRP values for the candidate channels in a predetermined order of indexes of corresponding RX beams.

According to some embodiments, the predetermined RSRP threshold $T_{RSRP}$ can be signaled to the UE from the AN, or predefined in the NR specification to be known by the UE. Alternatively, the UE can calculate the RSRP threshold by firstly determining a reference RSRP value $P_{ref}$ for the RSRP measurement procedure and then obtain the RSRP threshold by subtracting a predefined RSRP margin threshold from the reference RSRP value. That is, the RSRP threshold can be obtained by $T_{RSRP}=P_{ref}-\Delta$ (dB).

The reference RSRP value $P_{ref}$ can be obtained by performing RSRP measurement for all RX beams and selecting the highest RSRP value as the reference RSRP value for follow-up RSRP measurements, especially at the beginning of UE operations when there are no any previous measurements. With the reference RSRP value, the RSRP threshold can be calculated and saved for follow-up RSRP measurements.

Alternatively, when the UE has performed some previous RSRP measurements, the UE may determine the RSRP threshold $T_{RSRP}$ by using the RSRP value from the UE's prior report as the reference RSRP value. Furthermore, according to some embodiments, each time the UE completes a RSRP measurement procedure and reports a measured RSRP value to the AN, the UE can take the reported RSRP value as the reference RSRP value $P_{ref}$ and update the RSRP threshold $T_{RSRP}$ to be applied for follow-up RSRP measurements.

Figure 5:
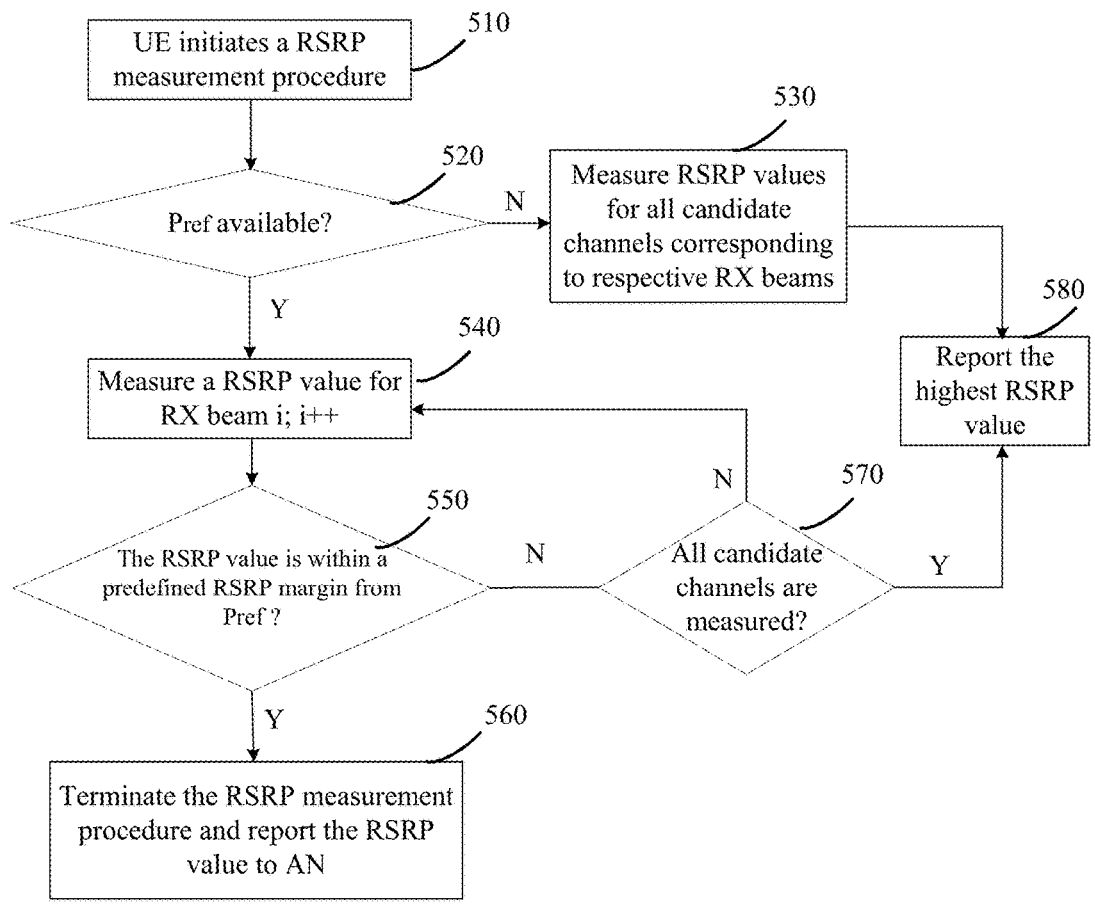
FIG. 5 shows a flow chart illustrating another method for implementing a quick RSRP measurement procedure at UE in accordance with some embodiments of the present disclosure.

FIG. 5 shows a flow chart illustrating another method for implementing a quick RSRP measurement procedure at UE in accordance with some embodiments of the present disclosure.

In block 510, the UE may initiate a measurement procedure to measure a RSRP value for each of one or more candidate channels between the UE and the AN, wherein each candidate channel corresponds to a respective RX beam from the UE. In block 520, the UE may determine whether a reference RSRP value $P_{ref}$ is available to the UE. If no reference RSRP value $P_{ref}$ is available to the UE, the UE may measure RSRP values for all candidate channels between the UE and the AN in block 530 and report a highest RSRP value among the measured RSRP values to the AN in block 580. That is, the UE may measure RSRP values for all candidate channels corresponding to all respective RX beams and report the highest RSRP value, as illustrated in FIG. 1.

If the UE has a reference RSRP value $P_{ref}$ available for the RSRP measurement, the UE may measure a RSRP value for a specific candidate channel in block 540 and compare the measured RSRP value with the reference RSRP value $P_{ref}$ in block 550. When a margin between the RSRP value measured for the specific candidate channel and the reference RSRP value $P_{ref}$ is less than a predefined RSRP margin threshold, i.e. when the RSRP value is within a predefined RSRP margin from the $P_{ref}$, the UE may terminate the measurement procedure and report the RSRP value measured for the specific candidate channel to the AN in block 560. Otherwise, the UE may continue to measure a RSRP value for a next candidate channel in block 540. If a margin between each of the RSRP values and the reference RSRP value is larger than the predefined RSRP margin threshold (i.e., no RSRP value is within the predefined RSRP margin from the $P_{ref}$) when the RSRP values for all candidate channels have been measured ('Y' in block 570), the UE may report the highest RSRP value among all the measured RSRP values in block 580. Also, it is noted that in block 540, an index of a RX beam is denoted by i, and the UE may measure the RSRP values for the candidate channels in a predetermined order of indexes of corresponding RX beams.

According to some embodiments, the reference RSRP value $P_{ref}$ can be obtained by performing RSRP measurement for all RX beams and selecting the highest RSRP value as the reference RSRP value for follow-up RSRP measurements, especially at the beginning of UE operations when there are no any previous measurements.

Alternatively, when the UE has performed some previous RSRP measurements, the UE may apply the RSRP value from the UE's prior report as the reference RSRP value. Furthermore, according to some embodiments, each time the UE completes a RSRP measurement procedure and reports a measured RSRP value to the AN, the UE can update the reference RSRP value $P_{ref}$ with the reported RSRP value.

The proposed RSRP measurement procedures according to embodiments of the present disclosure allow the UE to avoid exhaustive measurements for all of its RX beams. Thus it may be possible to reduce the time the UE with multiple RX beams spends for RSRP measurements.

Besides the low speed of RSRP measurements, the resources for DL measurements in the NR systems are very limited. Currently in the NR systems, the only DL resources, which UE knows for sure, are four OFDM symbols allocated to a detected Synchronization Signal/Physical Broadcast Channel (SS/PBCH) block. Multiple candidate SS/PBCH blocks can be transmitted in the NR network. Potentially, the UE can use them for DL measurements if provided with information about all SS/PBCH blocks that are actually transmitted by an Access Node (AN). According to related 3GPP technical specifications, in the NR network, this information is a part of the Remaining Minimal System Information (RMSI) (also referred to as System Information Block 1 (SIB1)). In order to read the RMSI to know about the actually transmitted SS/PBCH blocks, the UE may decode sequentially a Physical Broadcast Channel (PBCH), DL control and data channels.

In this way, when the UE is going to perform DL measurements, it may always decode the PBCH, DL control and data channels to read the RMSI of a target cell and thus get information about the actually transmitted SS/PBCH blocks from the AN, which may affect energy consumption of the UE and increase the time the UE spends for DL measurements.

Further, one purpose of DL measurements for mobility (e.g. measurements of Received Signal Strength Indicator (RSSI)) is to reflect a data transmission load of a target cell. However, in scenarios with simultaneous transmission of SS/PBCH blocks by two or more cells in the NR network, SS/PBCH blocks from the target cell will interfere only with SS/PBCH blocks from other cells but not with the DL data transmission in the target cell. In other words, the RSSI measurements based on the detected SS/PBCH blocks may not account the DL data transmission in the target cell. Such RSSI measurements may not reflect actual load conditions of DL data transmission in the target cell, because even if there are no UEs scheduled for DL data transmission in the target cell, the RSSI measurement may indicate a high load of DL data transmission.

In order to have additional resources for DL measurements other than the four OFDM symbols of the actually transmitted SS/PBCH blocks, it is proposed to allocate a certain number of symbols (e.g. OFDM symbols) at the beginning of NR slots containing actually transmitted SS/PBCH blocks as resources dedicated to DL transmission (e.g. DL control channels). The allocation of the certain number of symbols for DL transmission is known to both the UE and the AN in the target cell. Since the UE knows the certain number of symbols in corresponding NR slots are always allocated for DL transmission (i.e., dedicated to DL transmission), the UE can make DL measurements on these symbols rather than the symbols allocated to SS/PBCH blocks. In this way, it may be possible to avoid the UE always reading the RMSI by decoding the PBCH, DL control and data channels to get information about the actually transmitted SS/PBCH blocks each time when performing DL measurements.

Additionally, these first DL symbols in the NR slots with actually transmitted SS/PBCH blocks can be used by the AN in the target cell to transmit a Physical Downlink Control Channel (PDCCH) to schedule DL data transmission of the UE. If there are a lot of UEs scheduled with DL data transmission in the target cell, then the first DL symbols in the NR slots with actually transmitted SS/PBCH blocks will be highly loaded with NR PDCCH frequency allocations. With the less number of UEs scheduled with DL data transmission, the less number of NR PDCCH frequency allocations will be used, resulting in a light load of the first DL symbols in the NR slots. Thus, for example, RSSI measurements on the OFDM symbols at the beginning of the NR slots with actually transmitted SS/PBCH blocks can reflect an actual load of DL data transmission in the target cell.

In accordance with related 3GPP Technical Specifications, there may be different formats of mapping candidate SS/PBCH blocks to OFDM symbols in NR slots. Also, the mapping formats may be associated with a subcarrier spacing of SS/PBCH blocks.

Figure 6:
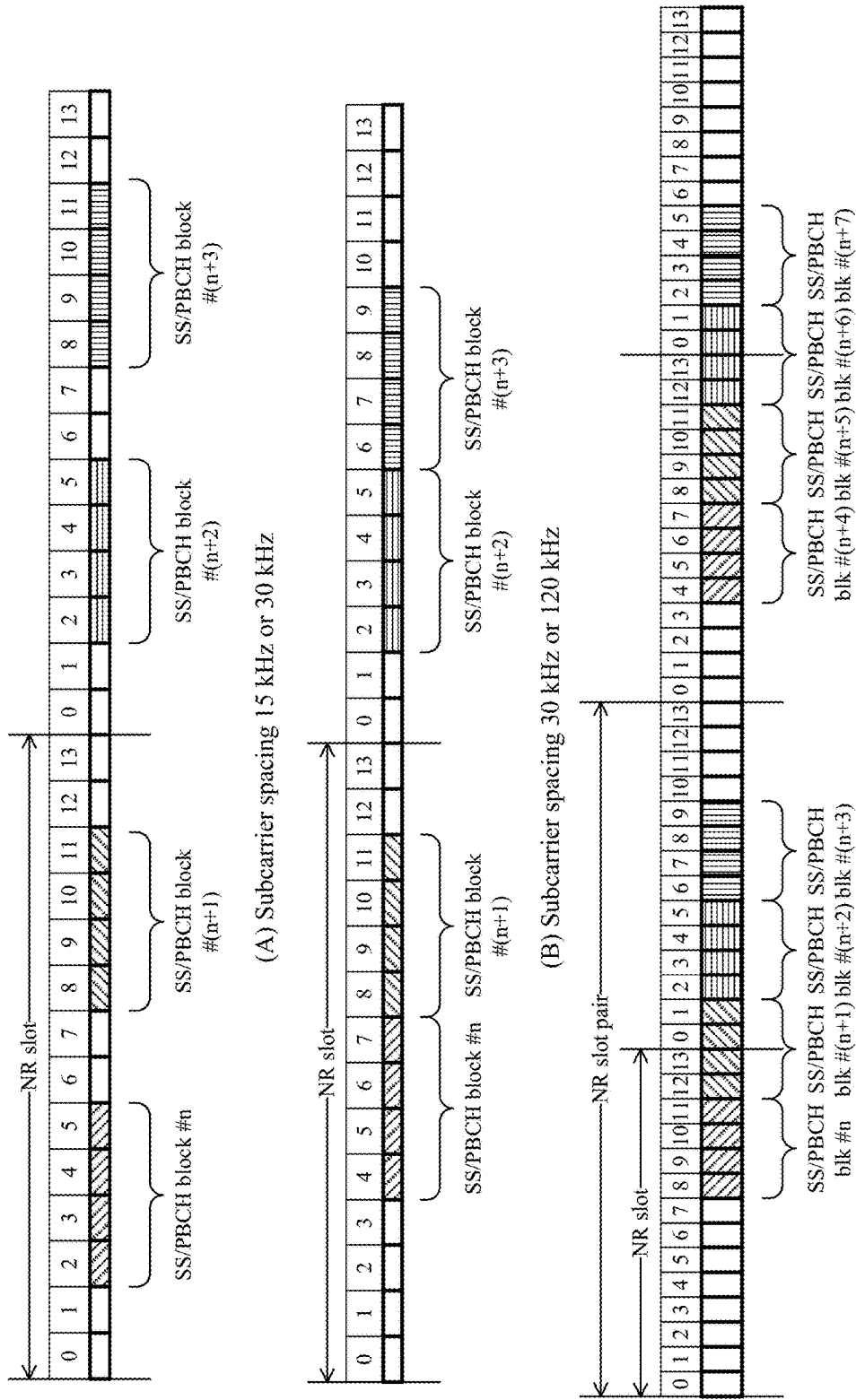
FIG. 6 shows three different example formats of mapping SS/PBCH blocks to OFDM symbols in NR slots according to related 3GPP Technical Specifications.

FIG. 6 shows three different example formats of mapping SS/PBCH blocks to OFDM symbols in NR slots according to related 3GPP Technical Specifications.

As illustrated in the figure, in Format (A), the subcarrier spacing of SS/PBCH blocks may be 15 kHz or 30 kHz, each NR slot of 14 OFDM symbols may contain two candidate SS/PBCH blocks, and the first symbols of the four candidate SS/PBCH blocks in two NR slots (including totally 28 symbols) have indexes of {2, 8, 16, 22}; in Format (B), the subcarrier spacing of SS/PBCH blocks may be 30 kHz or 120 kHz, each NR slot of 14 OFDM symbols may contain two candidate SS/PBCH blocks, and the first symbols of the four candidate SS/PBCH blocks in two NR slots (including totally 28 symbols) have indexes of {4, 8, 16, 20}; in Format (C), the subcarrier spacing of SS/PBCH blocks may be 240 kHz, each NR slot pair of 28 OFDM symbols may contain four candidate SS/PBCH blocks, and the first symbols of the candidate SS/PBCH blocks in two NR slot pairs (including totally 56 symbols) have indexes of {8, 12, 16, 20, 32, 36, 40, 44}.

According to some embodiments, when the UE detects a NR slot contains at least one actually transmitted SS/PBCH block, the UE may determine a predefined number of OFDM symbols at the beginning of the NR slot as dedicated to DL transmission and then perform DL measurements on the predefined number of OFDM symbols.

As an example, with respect to Formats (A) and (B) in FIG. 6, the predefined number may be 1 or 2, that is, the first symbol or the second symbol or both of them in the NR slot may be allocated as resources dedicated to DL transmission and thus may be utilized by the UE as resources for DL measurements. Likewise, with respect to Format (C), the predefined number may be 1, 2, 3 or 4, that is, at least one of the first four symbols in the NR slot pair may be allocated as resources dedicated to DL transmission and thus may be utilized by the UE as resources for DL measurements. The number of symbols at the beginning of each NR slot or NR slot pair may be configured depending on specific demands, which will not be limited in the present disclosure. For example, the possible number of symbols may be predefined and provided in the SS/PBCH payload, so that the UE can use all symbols or some of the symbols for DL measurements.

Figure 7:
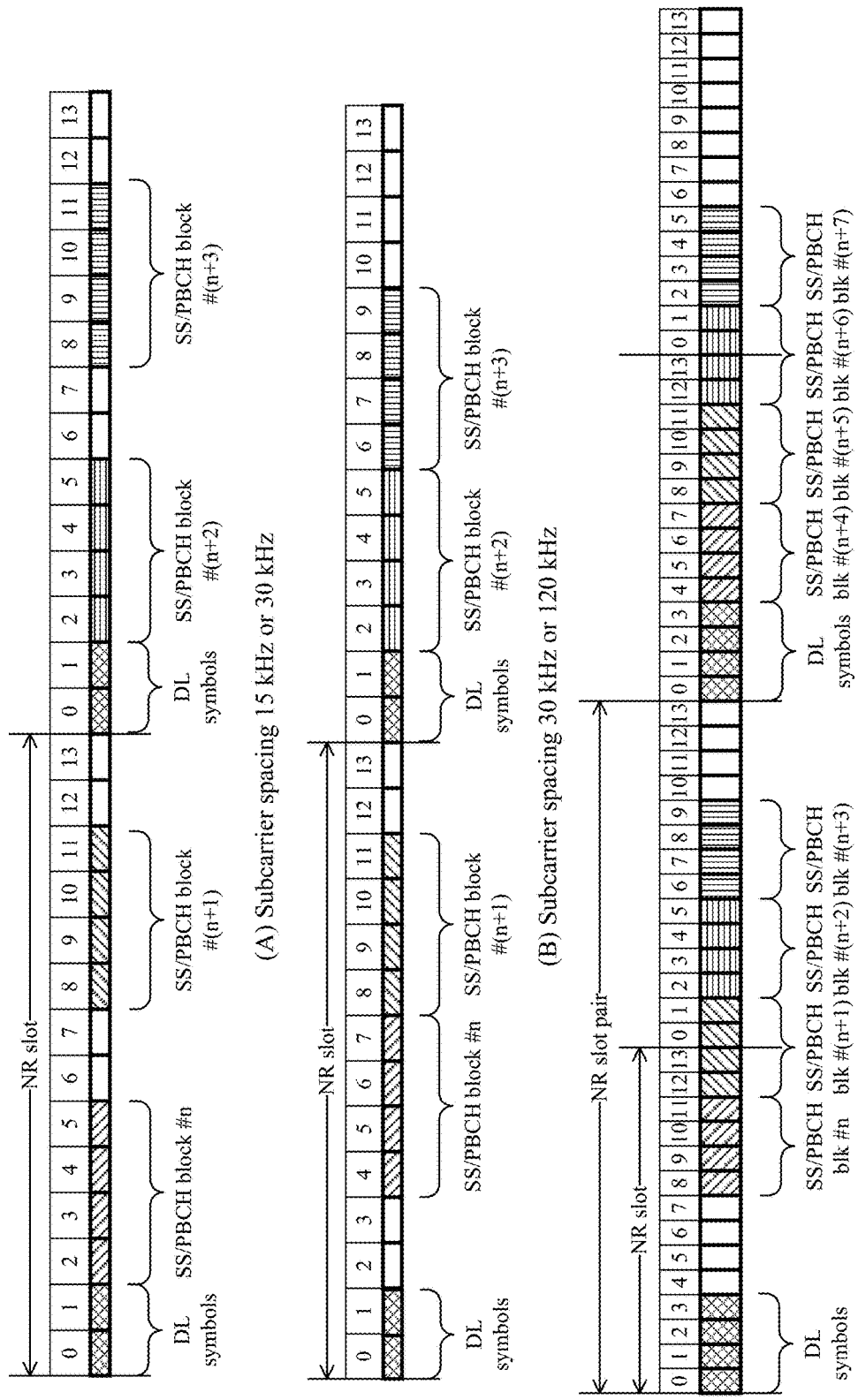
FIG. 7 shows example configurations of symbols dedicated to DL transmission at the beginning of NR slots with SS/PBCH blocks in accordance with some embodiments of the present disclosure.

FIG. 7 shows example configurations of symbols dedicated to DL transmission at the beginning of NR slots with SS/PBCH blocks in accordance with some embodiments of the present disclosure. As illustrated in FIG. 7, in Formats (A) and (B), the first two symbols in each NR slot are dedicated to DL transmission and thus may be utilized by the UE as resources for DL measurements; in Format (C), the first four symbols in each NR slot pair are dedicated to DL transmission and thus may be utilized by the UE as resources for DL measurements.

Furthermore, according to some embodiments, the AN may transmit a DL control channel (CORESET-Control Element Set) configured to indicate a DL data channel carrying RMSI associated with actually transmitted SS/PBCH blocks in a NR slot within the predefined number of OFDM symbols. Therefore, the UE may decode the DL control channel to read the RMSI, determine the actually transmitted SS/PBCH blocks and accordingly determine the predefined number of OFDM symbols at the beginning of the NR slot as dedicated to DL transmission. Then the UE may utilize the predefined number of symbols as resources for DL measurement.

In some other embodiments, there may be a predefined correspondence between indexes of the predefined number of symbols and indexes of the determined actually transmitted SS/PBCH blocks. When the UE detects a NR slot contains one or more actually transmitted SS/PBCH blocks, the UE may determine the predefined number of OFDM symbols at the beginning of the NR slot as resources dedicated to DL transmission, according to the predefined correspondence between the indexes of the predefined number of OFDM symbols and the indexes of the actually transmitted SS/PBCH blocks.

Figure 8:
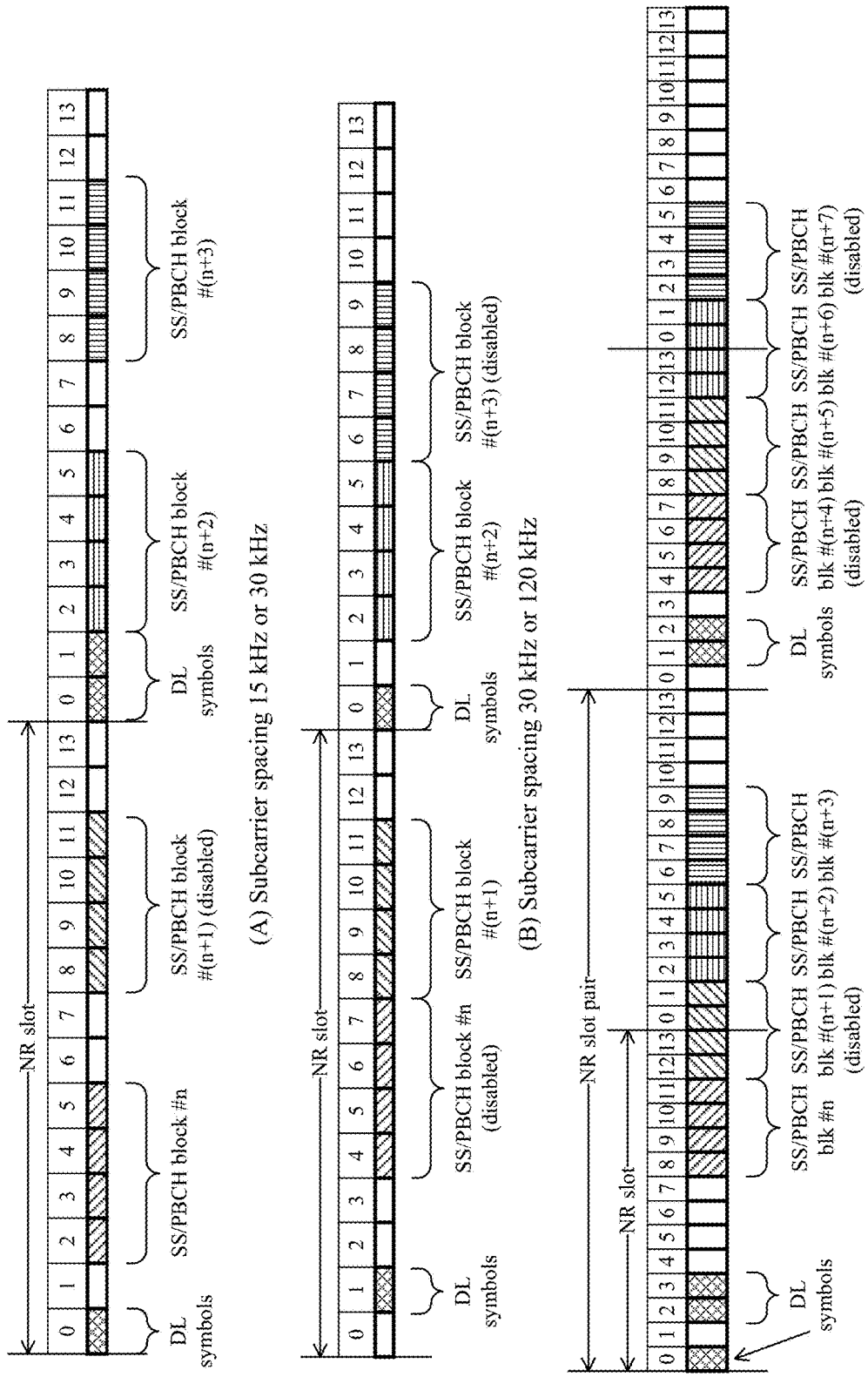
FIG. 8 shows example configurations of symbols dedicated to DL transmission at the beginning of NR slots with SS/PBCH blocks in accordance with some embodiments of the present disclosure.

FIG. 8 shows example configurations of symbols dedicated to DL transmission at the beginning of NR slots with SS/PBCH blocks in accordance with some embodiments of the present disclosure. In the example configurations of FIG. 8, the indexes of the predefined number of symbols and the indexes of the actually transmitted SS/PBCH blocks have a predefined correspondence. For example, for Format (A), in the first NR slot, the symbol #0 is allocated for DL transmission when the first SS/PBCH block is actually transmitted and the second SS/PBCH block is disabled; in the second NR slot, both the symbol #0 and the symbol #1 are allocated for DL transmission when both the first SS/PBCH block and the second SS/PBCH block are actually transmitted. For Format (B), in the first NR slot, the symbol #1 is allocated for DL transmission when the second SS/PBCH block is actually transmitted and the first SS/PBCH block is disabled; in the second NR slot, the symbol #0 is allocated for DL transmission when the first SS/PBCH block is actually transmitted and the second SS/PBCH block is disabled. For Format (C), in the first NR slot pair, the symbols #0, #2 and #3 are allocated for DL transmission when the first, the third and the fourth SS/PBCH blocks are actually transmitted and the second SS/PBCH block is disabled; in the second NR slot pair, the symbols #1 and #2 are allocated for DL transmission when the second and the third SS/PBCH blocks are actually transmitted and the first and the fourth SS/PBCH blocks are disabled.

Consequently in some embodiments, when the UE detects a NR slot contains one or more actually transmitted SS/PBCH block, the UE may determine the indexes of the predefined number of OFDM symbols at the beginning of the NR slot as dedicated to DL transmission according to the indexes of the actually transmitted SS/PBCH blocks. Then the UE may perform DL measurements on the predefined number of OFDM symbols instead of the actually transmitted SS/PBCH blocks.

Furthermore, the AN may transmit a DL control channel (CORESET-Control Element Set) configured to indicate a DL data channel carrying RMSI associated with an actually transmitted SS/PBCH block in a NR slot within a corresponding OFDM symbol at the beginning of the NR slot. Therefore, the UE may decode the DL control channel to read the RMSI, determine the index of the actually transmitted SS/PBCH block and accordingly determine the index of the corresponding OFDM symbol at the beginning of the NR slot as dedicated to DL transmission. In this way, the UE may determine the indexes of the predefined number of symbols as dedicated to DL transmission. Then the UE may utilize the predefined number of symbols for DL measurement.

With the predefined correspondence between the indexes of the OFDM symbols allocated for transmitting the DL control channel carrying the RMSI and the indexes of the actually transmitted SS/PBCH blocks, the UE can autonomously determine which OFDM symbols are allocated to transmit the DL control channel carrying the RMSI and then read the RSMI associated with the actually transmitted SS/PBCH blocks.

As described above, some additional resources may be allocated as resources dedicated to DL transmission and thus the UE may perform DL measurement based on the additional resources instead of the actually transmitted SS/PBCH blocks. It should be understood that the allocation of the additional resources is known to both the UE side and the AN side. For example, the possible number of symbols dedicated to DL transmission may be predefined and provided in the SS/PBCH payload.

Figure 9:
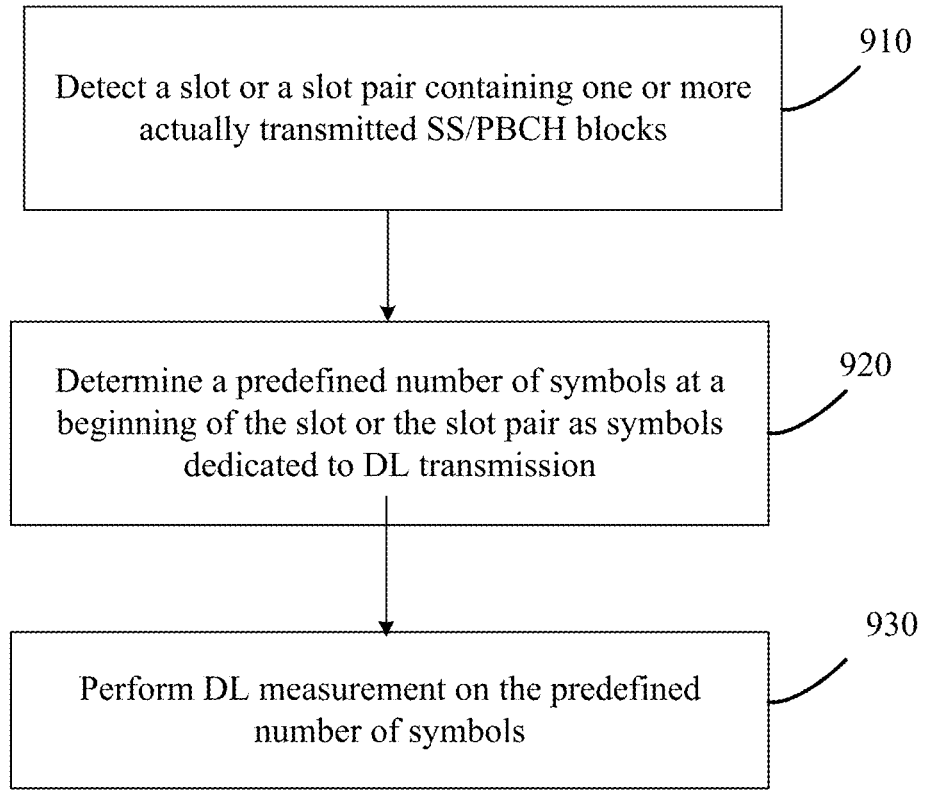
FIG. 9 is a flow chart illustrating a method for allocating additional resources to perform DL measurements at UE according to some embodiments of the present disclosure.

FIG. 9 is a flow chart illustrating a method for allocating additional resources to perform DL measurements at UE according to some embodiments of the present disclosure. In block 910, the UE may detect a slot or a slot pair containing one or more actually transmitted SS/PBCH blocks. Once the slot or the slot pair containing one or more actually transmitted SS/PBCH blocks is detected, the UE may determine a predefined number of symbols at a beginning of the slot or the slot pair as dedicated to DL transmission in block 920. In an example, the UE may determine the predefined number of symbols according to a predefined correspondence between indexes of the predefined number of symbols and indexes of the one or more actually transmitted SS/PBCH blocks. In block 930, the UE may perform a DL measurement on the predefined number of symbols dedicated to DL transmission.

Figure 10:
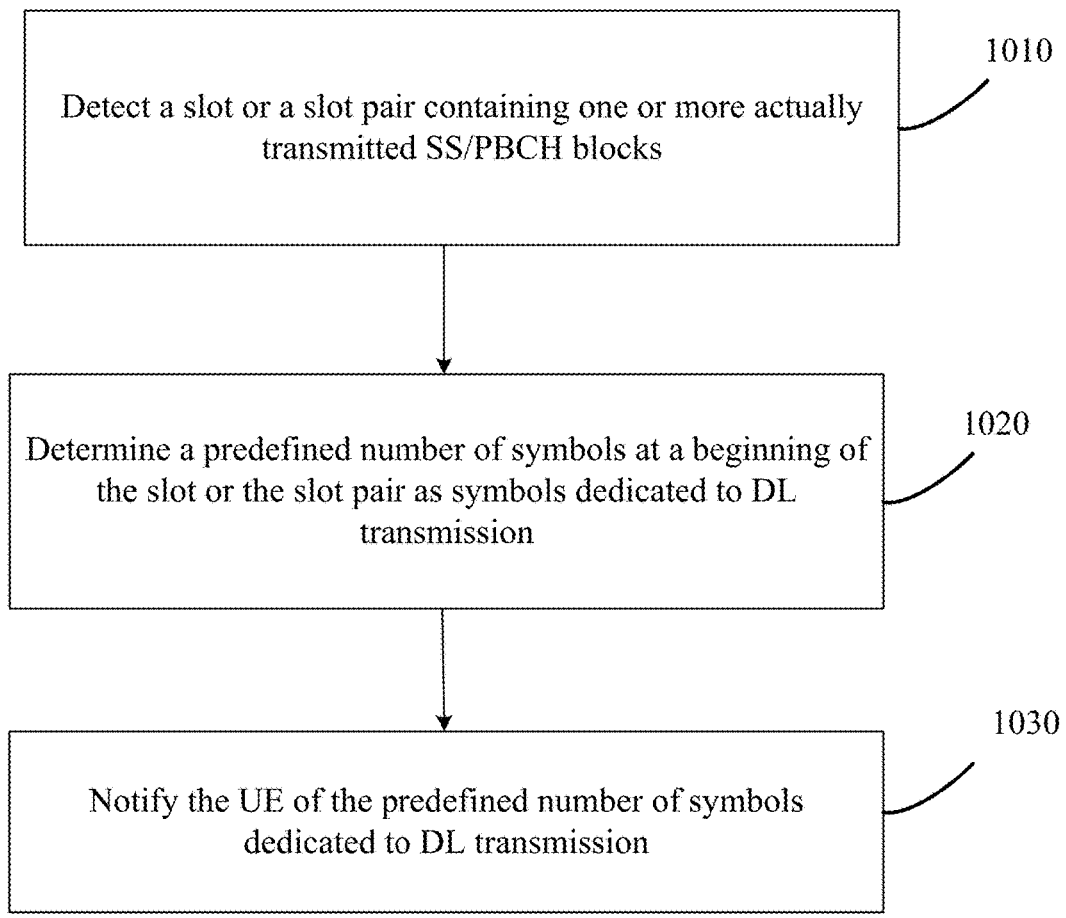
FIG. 10 is a flow chart illustrating a method to be performed at an AN for allocating additional resources for DL measurement according to some embodiments of the present disclosure.

FIG. 10 is a flow chart illustrating a method to be performed at an AN for allocating additional resources for DL measurement according to some embodiments of the present disclosure. In block 1010, the AN may detect a slot or a slot pair containing one or more actually transmitted SS/PBCH blocks. Once the slot or the slot pair containing one or more actually transmitted SS/PBCH blocks is detected, the AN may determine a predefined number of symbols at a beginning of the slot or the slot pair as dedicated to DL transmission in block 1020. In an example, the AN may determine the predefined number of symbols according to a predefined correspondence between indexes of the predefined number of symbols and indexes of the one or more actually transmitted SS/PBCH blocks. In block 1030, the AN may notify the UE of the predefined number of symbols dedicated to DL transmission for allowing the UE to perform a DL measurement on the predefined number of symbols. For example, the AN may transmit a RMSI COREST configuration as a part of the SS/PBCH payload in which the information about the symbols and frequency allocation for the DL control channel carrying the RMSI may be transmitted.

According to embodiments of the present disclosure, by allocating additional resources for DL measurement, it may be possible to avoid the UE always reading the RMSI by decoding the PBCH, DL control and data channels to get information about the actually transmitted SS/PBCH blocks each time when performing DL measurements. Additionally, the measurements on the OFDM symbols at the beginning of the NR slots instead of the actually transmitted SS/PBCH blocks can reflect an actual load of DL data transmission in the target cell.

Figure 11:
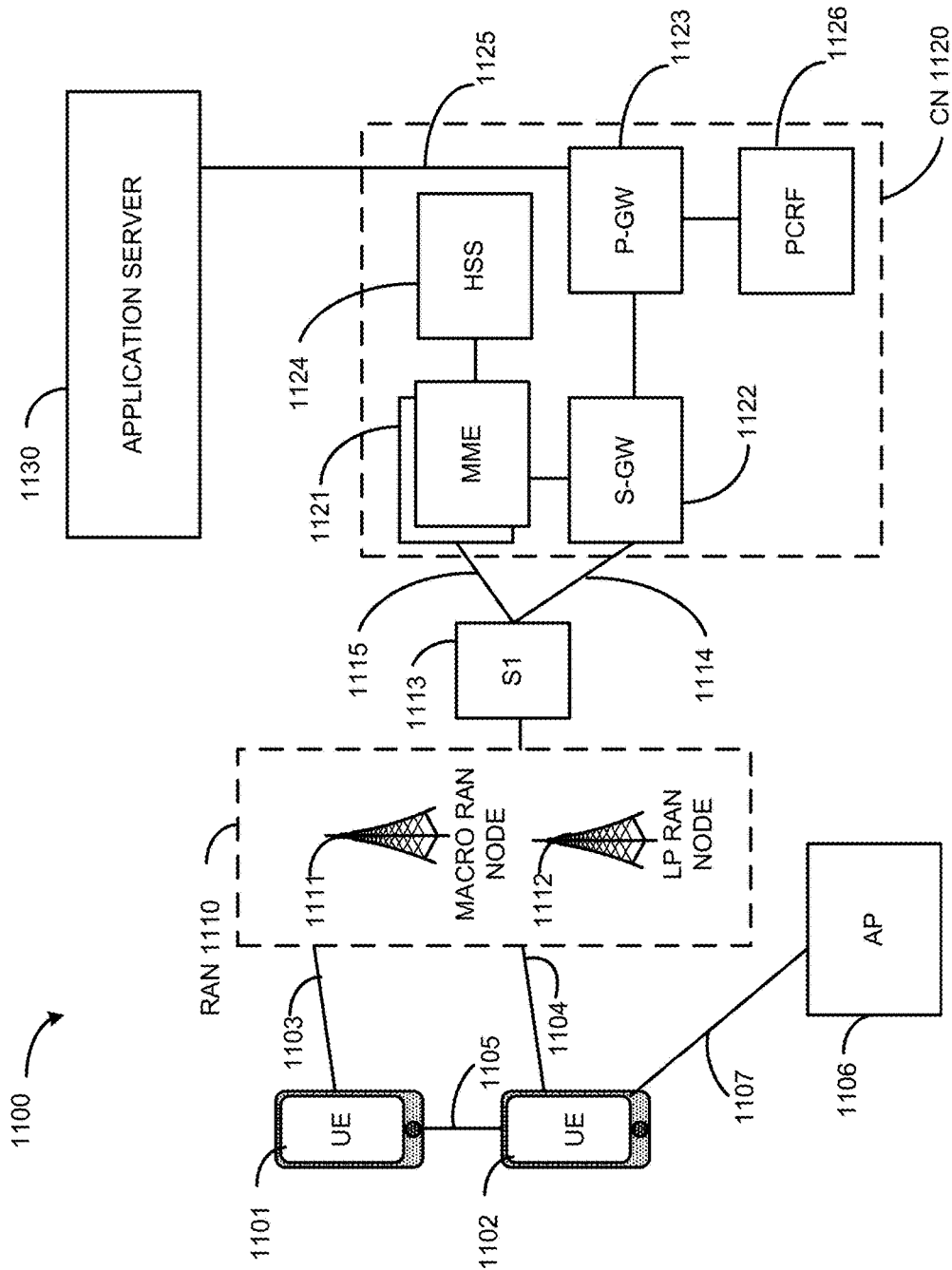
FIG. 11 shows an architecture of a system of a network in accordance with some embodiments of the disclosure.

FIG. 11 illustrates an architecture of a system 1100 of a network in accordance with some embodiments. The system 1100 is shown to include a user equipment (UE) 1101 and a UE 1102. The UEs 1101 and 1102 are illustrated as smartphones (e.g., handheld touchscreen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, any of the UEs 1101 and 1102 can include an Internet of Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1101 and 1102 may be configured to connect, e.g., communicatively couple, with a radio access network (RAN) 1110—the RAN 1110 may be, for example, an Evolved Universal Mobile Telecommunications System (UMTS) Terrestrial Radio Access Network (E-UTRAN), a NextGen RAN (NG RAN), or some other type of RAN. The UEs 1101 and 1102 utilize connections 1103 and 1104, respectively, each of which includes a physical communications interface or layer (discussed in further detail below); in this example, the connections 1103 and 1104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1101 and 1102 may further directly exchange communication data via a ProSe interface 1105. The ProSe interface 1105 may alternatively be referred to as a sidelink interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1102 is shown to be configured to access an access point (AP) 1106 via connection 1107. The connection 1107 can include a local wireless connection, such as a connection consistent with any IEEE 802.11 protocol, wherein the AP 1106 would include a wireless fidelity (WiFi®) router. In this example, the AP 1106 is shown to be connected to the Internet without connecting to the core network of the wireless system (described in further detail below).

The RAN 1110 can include one or more access nodes that enable the connections 1103 and 1104. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). The RAN 1110 may include one or more RAN nodes for providing macrocells, e.g., macro RAN node 1111, and one or more RAN nodes for providing femtocells or picocells (e.g., cells having smaller coverage areas, smaller user capacity, or higher bandwidth compared to macrocells), e.g., low power (LP) RAN node 1112.

Any of the RAN nodes 1111 and 1112 can terminate the air interface protocol and can be the first point of contact for the UEs 1101 and 1102. In some embodiments, any of the RAN nodes 1111 and 1112 can fulfill various logical functions for the RAN 1110 including, but not limited to, radio network controller (RNC) functions such as radio bearer management, uplink and downlink dynamic radio resource management and data packet scheduling, and mobility management.

In accordance with some embodiments, the UEs 1101 and 1102 can be configured to communicate using Orthogonal Frequency-Division Multiplexing (OFDM) communication signals with each other or with any of the RAN nodes 1111 and 1112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can include a plurality of orthogonal subcarriers.

In some embodiments, a downlink resource grid can be used for downlink transmissions from any of the RAN nodes 1111 and 1112 to the UEs 1101 and 1102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1101 and 1102. The physical downlink control channel (PDCCH) may carry information about the transport format and resource allocations related to the PDSCH channel, among other things. It may also inform the UEs 1101 and 1102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1111 and 1112 based on channel quality information fed back from any of the UEs 1101 and 1102. The downlink resource assignment information may be sent on the PDCCH used for (e.g., assigned to) each of the UEs 1101 and 1102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1110 is shown to be communicatively coupled to a core network (CN) 1120—via an S1 interface 1113. In embodiments, the CN 1120 may be an evolved packet core (EPC) network, a NextGen Packet Core (NPC) network, or some other type of CN. In this embodiment the S1 interface 1113 is split into two parts: the S1-U interface 1114, which carries traffic data between the RAN nodes 1111 and 1112 and the serving gateway (S-GW) 1122, and the S1-mobility management entity (MME) interface 1115, which is a signaling interface between the RAN nodes 1111 and 1112 and MMEs 1121.

In this embodiment, the CN 1120 includes the MMES 1121, the S-GW 1122, the Packet Data Network (PDN) Gateway (P-GW) 1123, and a home subscriber server (HSS) 1124. The MMES 1121 may be similar in function to the control plane of legacy Serving General Packet Radio Service (GPRS) Support Nodes (SGSN). The MMES 1121 may manage mobility aspects in access such as gateway selection and tracking area list management. The HSS 1124 may include a database for network users, including subscription-related information to support the network entities' handling of communication sessions. The CN 1120 may include one or several HSSs 1124, depending on the number of mobile subscribers, on the capacity of the equipment, on the organization of the network, etc. For example, the HSS 1124 can provide support for routing/roaming, authentication, authorization, naming/addressing resolution, location dependencies, etc.

The S-GW 1122 may terminate the S1 interface 1113 towards the RAN 1110, and routes data packets between the RAN 1110 and the CN 1120. In addition, the S-GW 1122 may be a local mobility anchor point for inter-RAN node handovers and also may provide an anchor for inter-3GPP mobility. Other responsibilities may include lawful intercept, charging, and some policy enforcement.

The P-GW 1123 may terminate an SGi interface toward a PDN. The P-GW 1123 may route data packets between the EPC network 1123 and external networks such as a network including the application server 1130 (alternatively referred to as application function (AF)) via an Internet Protocol (IP) interface 1125. Generally, the application server 1130 may be an element offering applications that use IP bearer resources with the core network (e.g., UMTS Packet Services (PS) domain, LTE PS data services, etc.). In this embodiment, the P-GW 1123 is shown to be communicatively coupled to an application server 1130 via an IP communications interface 1125. The application server 1130 can also be configured to support one or more communication services (e.g., Voice-over-Internet Protocol (VoIP) sessions, PTT sessions, group communication sessions, social networking services, etc.) for the UEs 1101 and 1102 via the CN 1120.

The P-GW 1123 may further be a node for policy enforcement and charging data collection. Policy and Charging Enforcement Function (PCRF) 1126 is the policy and charging control element of the CN 1120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1126 may be communicatively coupled to the application server 1130 via the P-GW 1123. The application server 1130 may signal the PCRF 1126 to indicate a new service flow and select the appropriate Quality of Service (QoS) and charging parameters. The PCRF 1126 may provision this rule into a Policy and Charging Enforcement Function (PCEF) (not shown) with the appropriate traffic flow template (TFT) and QoS class of identifier (QCI), which commences the QoS and charging as specified by the application server 1130.

Figure 12:
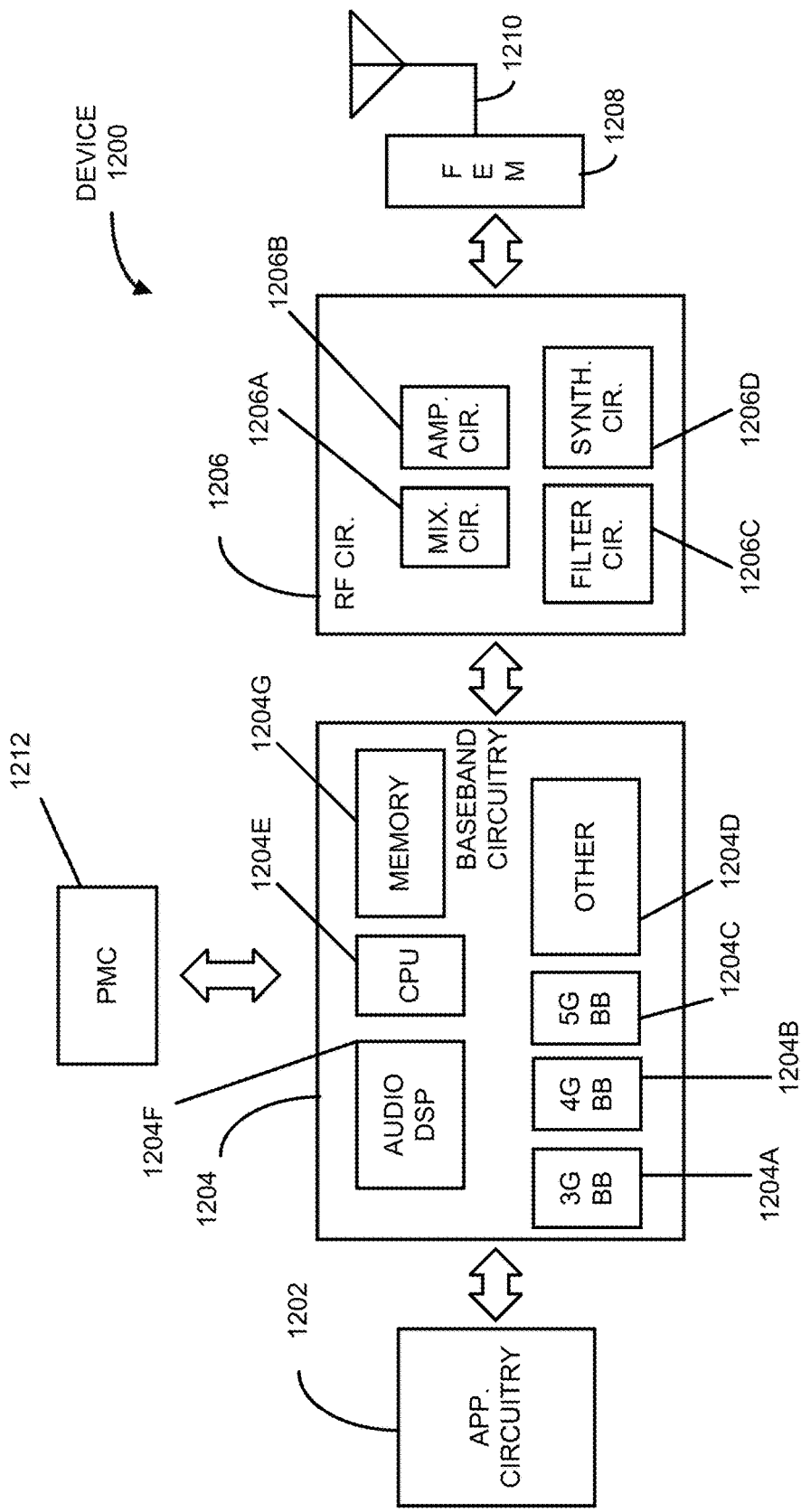
FIG. 12 illustrates example components of a device in accordance with some embodiments of the present disclosure.

FIG. 12 illustrates example components of a device 1200 in accordance with some embodiments. In some embodiments, the device 1200 may include application circuitry 1202, baseband circuitry 1204, Radio Frequency (RF) circuitry 1206, front-end module (FEM) circuitry 1208, one or more antennas 1210, and power management circuitry (PMC) 1212 coupled together at least as shown. The components of the illustrated device 1200 may be included in a UE or a RAN node. In some embodiments, the device 1200 may include less elements (e.g., a RAN node may not utilize application circuitry 1202, and instead include a processor/controller to process IP data received from an EPC). In some embodiments, the device 1200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1202 may include one or more application processors. For example, the application circuitry 1202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1200. In some embodiments, processors of application circuitry 1202 may process IP data packets received from an EPC.

The baseband circuitry 1204 may include circuitry such as, but not limited to, one or more single-core or multi-core processors. The baseband circuitry 1204 may include one or more baseband processors or control logic to process baseband signals received from a receive signal path of the RF circuitry 1206 and to generate baseband signals for a transmit signal path of the RF circuitry 1206. Baseband processing circuitry 1204 may interface with the application circuitry 1202 for generation and processing of the baseband signals and for controlling operations of the RF circuitry 1206. For example, in some embodiments, the baseband circuitry 1204 may include a third generation (3G) baseband processor 1204A, a fourth generation (4G) baseband processor 1204B, a fifth generation (5G) baseband processor 1204C, or other baseband processor(s) 1204D for other existing generations, generations in development or to be developed in the future (e.g., second generation (2G), sixth generation (6G), etc.). The baseband circuitry 1204 (e.g., one or more of baseband processors 1204A-D) may handle various radio control functions that enable communication with one or more radio networks via the RF circuitry 1206. In other embodiments, some or all of the functionality of baseband processors 1204A-D may be included in modules stored in the memory 1204G and executed via a Central Processing Unit (CPU) 1204E. The radio control functions may include, but are not limited to, signal modulation/demodulation, encoding/decoding, radio frequency shifting, etc. In some embodiments, modulation/demodulation circuitry of the baseband circuitry 1204 may include Fast-Fourier Transform (FFT), precoding, or constellation mapping/demapping functionality. In some embodiments, encoding/decoding circuitry of the baseband circuitry 1204 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1204 may include one or more audio digital signal processor(s) (DSP) 1204F. The audio DSP(s) 1204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1204 and the application circuitry 1202 may be implemented together such as, for example, on a system on a chip (SOC).

In some embodiments, the baseband circuitry 1204 may provide for communication compatible with one or more radio technologies. For example, in some embodiments, the baseband circuitry 1204 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1204 is configured to support radio communications of more than one wireless protocol may be referred to as multi-mode baseband circuitry.

RF circuitry 1206 may enable communication with wireless networks using modulated electromagnetic radiation through a non-solid medium. In various embodiments, the RF circuitry 1206 may include switches, filters, amplifiers, etc. to facilitate the communication with the wireless network. RF circuitry 1206 may include a receive signal path which may include circuitry to down-convert RF signals received from the FEM circuitry 1208 and provide baseband signals to the baseband circuitry 1204. RF circuitry 1206 may also include a transmit signal path which may include circuitry to up-convert baseband signals provided by the baseband circuitry 1204 and provide RF output signals to the FEM circuitry 1208 for transmission.

In some embodiments, the receive signal path of the RF circuitry 1206 may include mixer circuitry 1206a, amplifier circuitry 1206b and filter circuitry 1206c. In some embodiments, the transmit signal path of the RF circuitry 1206 may include filter circuitry 1206c and mixer circuitry 1206a. RF circuitry 1206 may also include synthesizer circuitry 1206d for synthesizing a frequency for use by the mixer circuitry 1206a of the receive signal path and the transmit signal path. In some embodiments, the mixer circuitry 1206a of the receive signal path may be configured to down-convert RF signals received from the FEM circuitry 1208 based on the synthesized frequency provided by synthesizer circuitry 1206d. The amplifier circuitry 1206b may be configured to amplify the down-converted signals and the filter circuitry 1206c may be a low-pass filter (LPF) or band-pass filter (BPF) configured to remove unwanted signals from the down-converted signals to generate output baseband signals. Output baseband signals may be provided to the baseband circuitry 1204 for further processing. In some embodiments, the output baseband signals may be zero-frequency baseband signals, although this is not a requirement. In some embodiments, mixer circuitry 1206a of the receive signal path may include passive mixers, although the scope of the embodiments is not limited in this respect.

In some embodiments, the mixer circuitry 1206a of the transmit signal path may be configured to up-convert input baseband signals based on the synthesized frequency provided by the synthesizer circuitry 1206d to generate RF output signals for the FEM circuitry 1208. The baseband signals may be provided by the baseband circuitry 1204 and may be filtered by filter circuitry 1206c.

In some embodiments, the mixer circuitry 1206a of the receive signal path and the mixer circuitry 1206a of the transmit signal path may include two or more mixers and may be arranged for quadrature downconversion and upconversion, respectively. In some embodiments, the mixer circuitry 1206a of the receive signal path and the mixer circuitry 1206a of the transmit signal path may include two or more mixers and may be arranged for image rejection (e.g., Hartley image rejection). In some embodiments, the mixer circuitry 1206a of the receive signal path and the mixer circuitry 1206*a* may be arranged for direct downconversion and direct upconversion, respectively. In some embodiments, the mixer circuitry 1206*a* of the receive signal path and the mixer circuitry 1206*a* of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1206 may include analog-to-digital converter (ADC) and digital-to-analog converter (DAC) circuitry and the baseband circuitry 1204 may include a digital baseband interface to communicate with the RF circuitry 1206.

In some dual-mode embodiments, a separate radio IC circuitry may be provided for processing signals for each spectrum, although the scope of the embodiments is not limited in this respect.

In some embodiments, the synthesizer circuitry 1206*d* may be a fractional-N synthesizer or a fractional N/N+1 synthesizer, although the scope of the embodiments is not limited in this respect as other types of frequency synthesizers may be suitable. For example, synthesizer circuitry 1206*d* may be a delta-sigma synthesizer, a frequency multiplier, or a synthesizer including a phase-locked loop with a frequency divider.

The synthesizer circuitry 1206*d* may be configured to synthesize an output frequency for use by the mixer circuitry 1206*a* of the RF circuitry 1206 based on a frequency input and a divider control input. In some embodiments, the synthesizer circuitry 1206*d* may be a fractional N/N+1 synthesizer.

In some embodiments, frequency input may be provided by a voltage controlled oscillator (VCO), although that is not a requirement. Divider control input may be provided by either the baseband circuitry 1204 or the applications processor 1202 depending on the desired output frequency. In some embodiments, a divider control input (e.g., N) may be determined from a look-up table based on a channel indicated by the applications processor 1202.

Synthesizer circuitry 1206*d* of the RF circuitry 1206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1206*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1206 may include an IQ/polar converter.

FEM circuitry 1208 may include a receive signal path which may include circuitry configured to operate on RF signals received from one or more antennas 1210, amplify the received signals and provide the amplified versions of the received signals to the RF circuitry 1206 for further processing. FEM circuitry 1208 may also include a transmit signal path which may include circuitry configured to amplify signals for transmission provided by the RF circuitry 1206 for transmission by one or more of the one or more antennas 1210. In various embodiments, the amplification through the transmit or receive signal paths may be done solely in the RF circuitry 1206, solely in the FEM 1208, or in both the RF circuitry 1206 and the FEM 1208.

In some embodiments, the FEM circuitry 1208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1206). The transmit signal path of the FEM circuitry 1208 may include a power amplifier (PA) to amplify input RF signals (e.g., provided by RF circuitry 1206), and one or more filters to generate RF signals for subsequent transmission (e.g., by one or more of the one or more antennas 1210).

In some embodiments, the PMC 1212 may manage power provided to the baseband circuitry 1204. In particular, the PMC 1212 may control power-source selection, voltage scaling, battery charging, or DC-to-DC conversion. The PMC 1212 may often be included when the device 1200 is capable of being powered by a battery, for example, when the device is included in a UE. The PMC 1212 may increase the power conversion efficiency while providing desirable implementation size and heat dissipation characteristics.

While FIG. 12 shows the PMC 1212 coupled only with the baseband circuitry 1204. However, in other embodiments, the PMC 12 12 may be additionally or alternatively coupled with, and perform similar power management operations for, other components such as, but not limited to, application circuitry 1202, RF circuitry 1206, or FEM 1208.

In some embodiments, the PMC 1212 may control, or otherwise be part of, various power saving mechanisms of the device 1200. For example, if the device 1200 is in an RRC_Connected state, where it is still connected to the RAN node as it expects to receive traffic shortly, then it may enter a state known as Discontinuous Reception Mode (DRX) after a period of inactivity. During this state, the device 1200 may power down for brief intervals of time and thus save power.

If there is no data traffic activity for an extended period of time, then the device 1200 may transition off to an RRC_Idle state, where it disconnects from the network and does not perform operations such as channel quality feedback, handover, etc. The device 1200 goes into a very low power state and it performs paging where again it periodically wakes up to listen to the network and then powers down again. The device 1200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1202 and processors of the baseband circuitry 1204 may be used to execute elements of one or more instances of a protocol stack. For example, processors of the baseband circuitry 1204, alone or in combination, may be used execute Layer 3, Layer 2, or Layer 1 functionality, while processors of the application circuitry 1204 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 13:
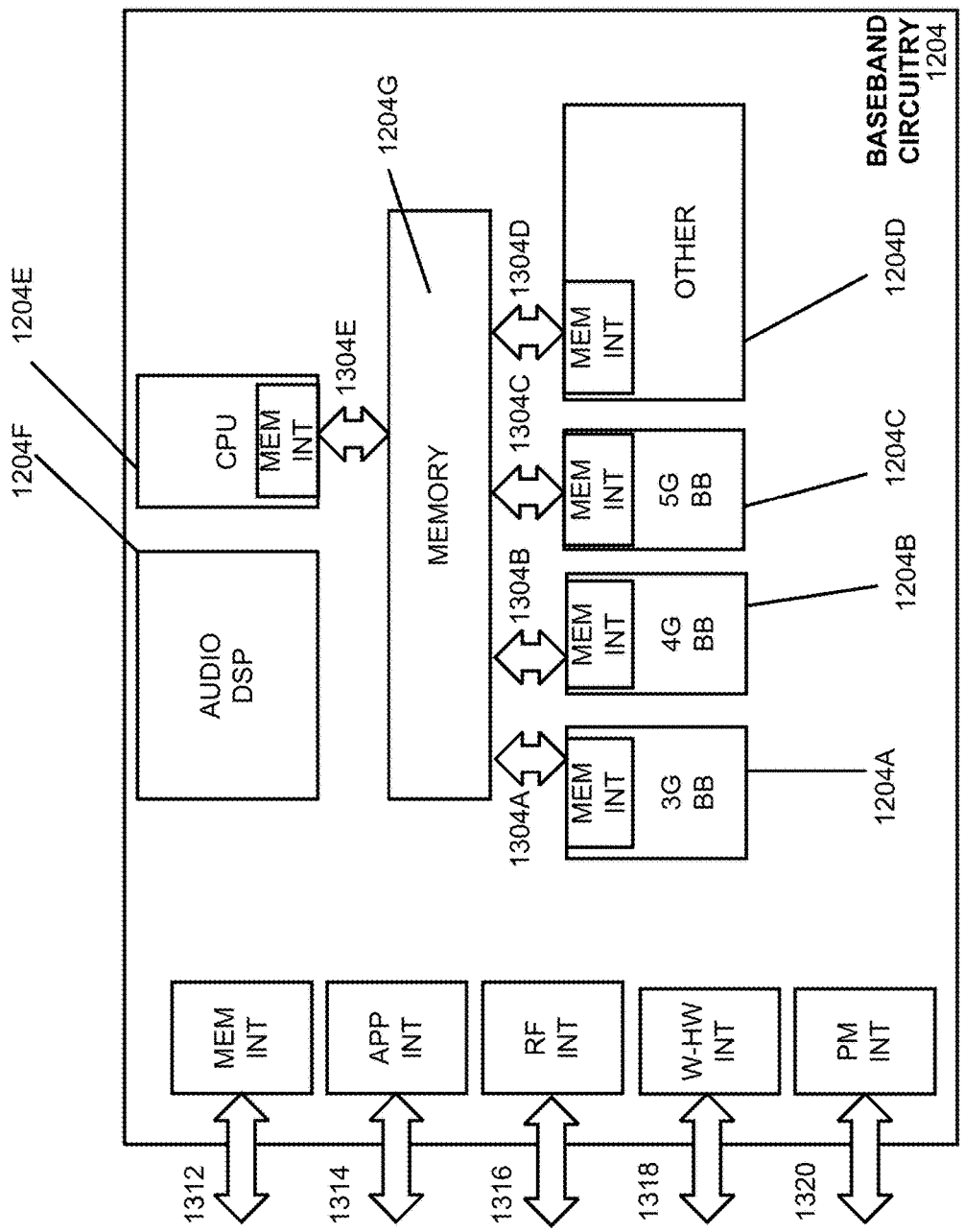
FIG. 13 illustrates example interfaces of baseband circuitry in accordance with some embodiments of the present disclosure.

FIG. 13 illustrates example interfaces of baseband circuitry in accordance with some embodiments. As discussed above, the baseband circuitry 1204 of FIG. 12 may include processors 1204A-1204E and a memory 1204G utilized by said processors. Each of the processors 1204A-1204E may include a memory interface, 1304A-1304E, respectively, to send/receive data to/from the memory 1204G.

The baseband circuitry 1204 may further include one or more interfaces to communicatively couple to other circuitries/devices, such as a memory interface 1312 (e.g., an interface to send/receive data to/from memory external to the baseband circuitry 1204), an application circuitry interface 1314 (e.g., an interface to send/receive data to/from the application circuitry 1202 of FIG. 12), an RF circuitry interface 1316 (e.g., an interface to send/receive data to/from RF circuitry 1206 of FIG. 12), a wireless hardware connectivity interface 1318 (e.g., an interface to send/receive data to/from Near Field Communication (NFC) components, Bluetooth® components (e.g., Bluetooth® Low Energy), Wi-Fi® components, and other communication components), and a power management interface 1320 (e.g., an interface to send/receive power or control signals to/from the PMC 1212).

Figure 14:
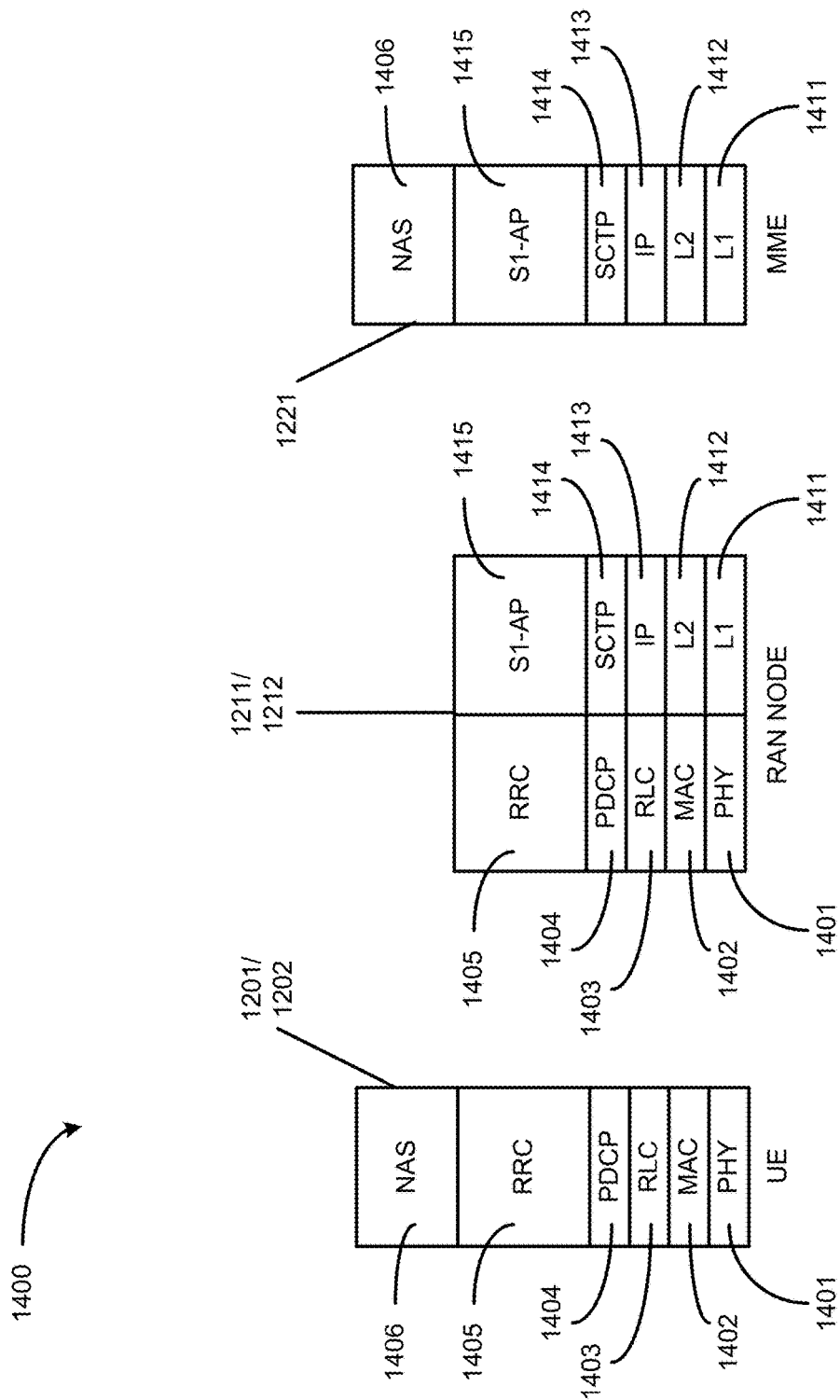
FIG. 14 is an illustration of a control plane protocol stack in accordance with some embodiments of the present disclosure.

FIG. 14 is an illustration of a control plane protocol stack in accordance with some embodiments. In this embodiment, a control plane 1400 is shown as a communications protocol stack between the UE 1101 (or alternatively, the UE 1102), the RAN node 1111 (or alternatively, the RAN node 1112), and the MME 1121.

The PHY layer 1401 may transmit or receive information used by the MAC layer 1402 over one or more air interfaces. The PHY layer 1401 may further perform link adaptation or adaptive modulation and coding (AMC), power control, cell search (e.g., for initial synchronization and handover purposes), and other measurements used by higher layers, such as the RRC layer 1405. The PHY layer 1401 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1402 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

The RLC layer 1403 may operate in a plurality of modes of operation, including: Transparent Mode (TM), Unacknowledged Mode (UM), and Acknowledged Mode (AM). The RLC layer 1403 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1403 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

The PDCP layer 1404 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1405 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point to point Radio Bearers, security functions including key management, inter radio access technology (RAT) mobility, and measurement configuration for UE measurement reporting. Said MIBs and SIBs may include one or more information elements (IEs), which may each include individual data fields or data structures.

The UE 1101 and the RAN node 1111 may utilize a Uu interface (e.g., an LTE-Uu interface) to exchange control plane data via a protocol stack including the PHY layer 1401, the MAC layer 1402, the RLC layer 1403, the PDCP layer 1404, and the RRC layer 1405.

The non-access stratum (NAS) protocols 1406 form the highest stratum of the control plane between the UE 1101 and the MME 1121. The NAS protocols 1406 support the mobility of the UE 1101 and the session management procedures to establish and maintain IP connectivity between the UE 1101 and the P-GW 1123.

The S1 Application Protocol (S1-AP) layer 1415 may support the functions of the S1 interface and include Elementary Procedures (EPs). An EP is a unit of interaction between the RAN node 1111 and the CN 1120. The S1-AP layer services may include two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the SCTP/IP layer) 1414 may ensure reliable delivery of signaling messages between the RAN node 1111 and the MME 1121 based, in part, on the IP protocol, supported by the IP layer 1413. The L2 layer 1412 and the L1 layer 1411 may refer to communication links (e.g., wired or wireless) used by the RAN node and the MME to exchange information.

The RAN node 1111 and the MME 1121 may utilize an S1-MME interface to exchange control plane data via a protocol stack including the L1 layer 1411, the L2 layer 1412, the IP layer 1413, the SCTP layer 1414, and the S1-AP layer 1415.

Figure 15:
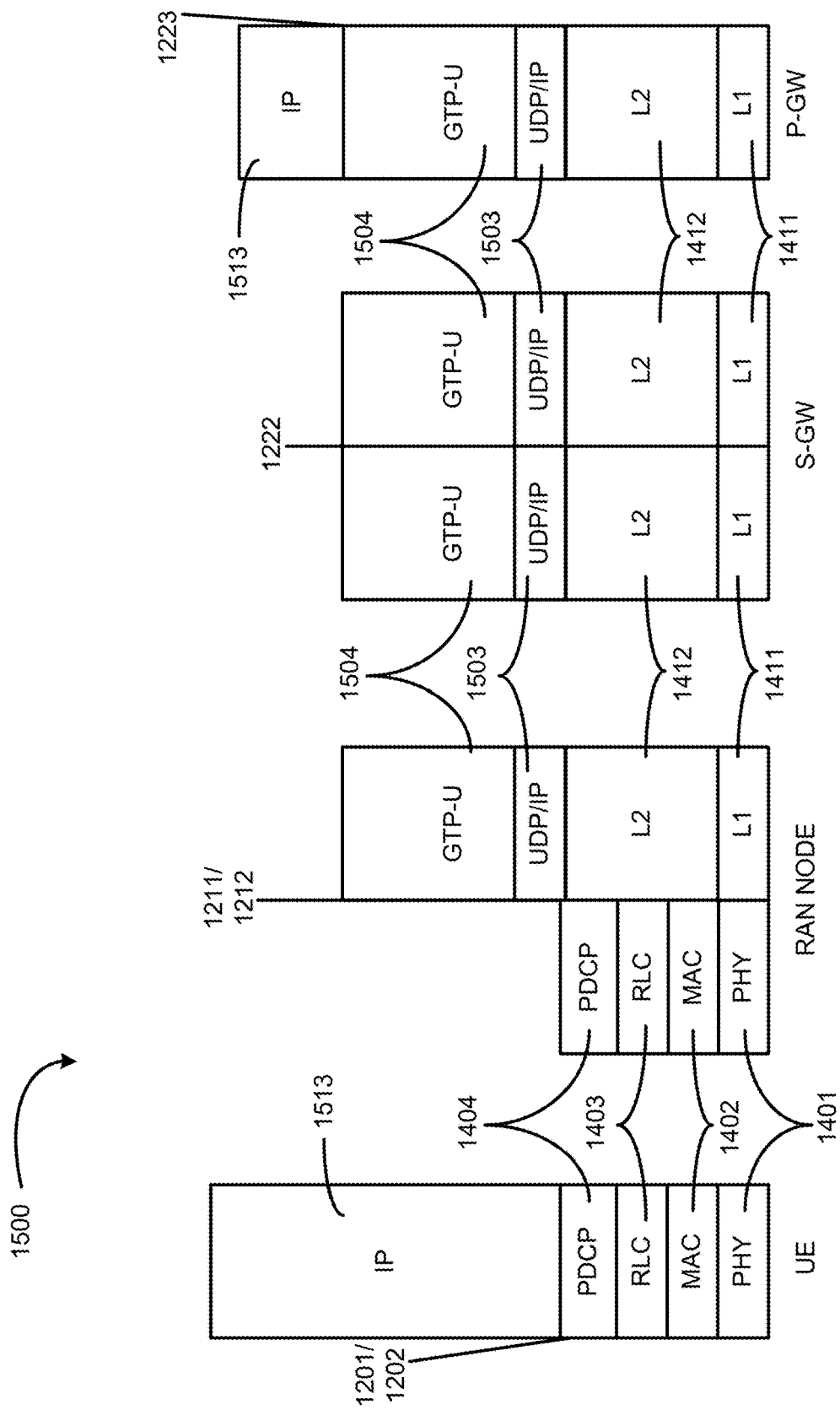
FIG. 15 is an illustration of a user plane protocol stack in accordance with some embodiments of the present disclosure.

FIG. 15 is an illustration of a user plane protocol stack in accordance with some embodiments. In this embodiment, a user plane 1500 is shown as a communications protocol stack between the UE 1101 (or alternatively, the UE 1102), the RAN node 1111 (or alternatively, the RAN node 1112), the S-GW 1122, and the P-GW 1123. The user plane 1500 may utilize at least some of the same protocol layers as the control plane 1400. For example, the UE 1101 and the RAN node 1111 may utilize a Uu interface (e.g., an LTE-Uu interface) to exchange user plane data via a protocol stack including the PHY layer 1401, the MAC layer 1402, the RLC layer 1403, the PDCP layer 1404.

The General Packet Radio Service (GPRS) Tunneling Protocol for the user plane (GTP-U) layer 1504 may be used for carrying user data within the GPRS core network and between the radio access network and the core network. The user data transported can be packets in any of IPv4, IPv6, or PPP formats, for example. The UDP and IP security (UDP/IP) layer 1503 may provide checksums for data integrity, port numbers for addressing different functions at the source and destination, and encryption and authentication on the selected data flows. The RAN node 1111 and the S-GW 1122 may utilize an S1-U interface to exchange user plane data via a protocol stack including the L1 layer 1411, the L2 layer 1412, the UDP/IP layer 1503, and the GTP-U layer 1504. The S-GW 1122 and the P-GW 1123 may utilize an S5/S8a interface to exchange user plane data via a protocol stack including the L1 layer 1411, the L2 layer 1412, the UDP/IP layer 1503, and the GTP-U layer 1504. As discussed above with respect to FIG. 14, NAS protocols support the mobility of the UE 1101 and the session management procedures to establish and maintain IP connectivity between the UE 1101 and the P-GW 1123.

Figure 16:
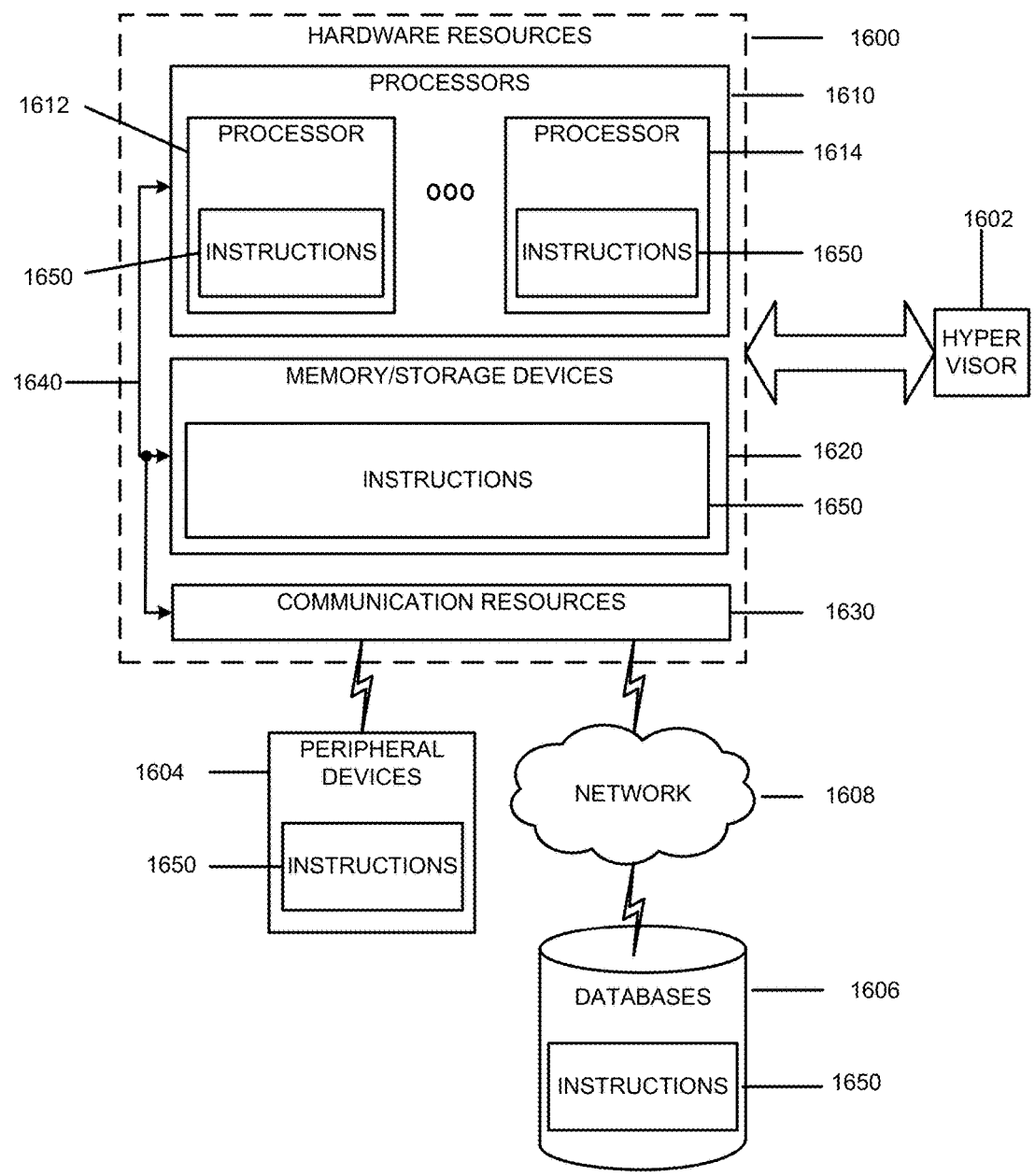
FIG. 16 is a block diagram illustrating components, according to some example embodiments of the present disclosure, able to read instructions from a machine-readable or computer-readable medium (e.g., a non-transitory machine-readable storage medium) and perform any one or more of the methodologies discussed herein.

FIG. 16 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1600 including one or more processors (or processor cores) 1610, one or more memory/storage devices 1620, and one or more communication resources 1630, each of which may be communicatively coupled via a bus 1640. For embodiments where node virtualization (e.g., NFV) is utilized, a hypervisor 1602 may be executed to provide an execution environment for one or more network slices/sub-slices to utilize the hardware resources 1600.

The processors 1610 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1612 and a processor 1614.

The memory/storage devices 1620 may include main memory, disk storage, or any suitable combination thereof. The memory/storage devices 1620 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1630 may include interconnection or network interface components or other suitable devices to communicate with one or more peripheral devices 1604 or one or more databases 1606 via a network 1608. For example, the communication resources 1630 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1650 may include software, a program, an application, an applet, an app, or other executable code for causing at least any of the processors 1610 to perform any one or more of the methodologies discussed herein. The instructions 1650 may reside, completely or partially, within at least one of the processors 1610 (e.g., within the processor's cache memory), the memory/storage devices 1620, or any suitable combination thereof. Furthermore, any portion of the instructions 1650 may be transferred to the hardware resources 1600 from any combination of the peripheral devices 1604 or the databases 1606. Accordingly, the memory of processors 1610, the memory/storage devices 1620, the peripheral devices 1604, and the databases 1606 are examples of computer-readable and machine-readable media.

Some non-limiting examples are provided below.

Example 1 includes an apparatus for User Equipment (UE), including a memory interface configured to receive a predetermined Reference Signal Received Power (RSRP) threshold from a memory; and a processor coupled with the memory interface and configured to: initiate a measurement procedure to measure a RSRP value for each of one or more candidate channels between the UE and an Access Node (AN), wherein each candidate channel corresponds to a respective Receive (RX) beam from the UE; compare the RSRP value measured for a candidate channel of the one or more candidate channels with the predetermined RSRP threshold; and terminate the measurement procedure and encode the RSRP value measured for the candidate channel to be reported from the UE to the AN, when the RSRP value measured for the candidate channel is higher than the predetermined RSRP threshold.

Example 2 includes the apparatus of example 1, wherein when no predetermined RSRP threshold is available to the UE or no RSRP value is higher than the predetermined RSRP threshold, the processor is further configured to measure RSRP values for all candidate channels between the UE and the AN and encode a highest RSRP value among the measured RSRP values, wherein the encoded highest RSRP value is reported from the UE to the AN.

Example 3 includes the apparatus of example 1, wherein the predetermined RSRP threshold is signaled to the UE from the AN, or predefined to be known by the UE.

Example 4 includes the apparatus of example 1, wherein the processor is further configured to: determine a reference RSRP value for the measurement procedure; and obtain the predetermined RSRP threshold by subtracting a predefined RSRP margin threshold from the reference RSRP value.

Example 5 includes the apparatus of example 4, wherein when there are no any previous RSRP measurements on the UE, the processor is further configured to: measure RSRP values for all candidate channels between the UE and the AN; determine a highest RSRP value among the measured RSRP values; encode the highest RSRP value to be reported from the UE to the AN; and set the determined highest RSRP value to be the reference RSRP value.

Example 6 includes the apparatus of example 4, wherein when there is a previous RSRP measurement and report on the UE, the processor is further configured to determine a RSRP value previously reported from the UE to the AN as the reference RSRP value.

Example 7 includes the apparatus of example 4, wherein when there is a previous RSRP measurement and report on the UE, the processor is further configured to: determine a latest RSRP value reported from the UE to the AN; and update the reference RSRP value to be the latest RSRP value reported from the UE.

Example 8 includes the apparatus of example 1, wherein the RSRP value is measured based on a Reference Signal (RS) including a Synchronization Signal (SS), a SS together with a Physical Broadcasting Channel (PBCH), a Channel State Information Reference Signal (CSI-RS) or a Demodulation Reference Signal (DM-RS).

Example 9 includes an apparatus for User Equipment (UE), including a memory interface configured to receive a reference Reference Signal Received Power (RSRP) value from a memory; and a processor coupled with the memory interface and configured to: initiate a measurement procedure to measure a RSRP value for each of one or more candidate channels between the UE and an Access Node (AN), wherein each candidate channel corresponds to a respective Receive (RX) beam from the UE; compare the RSRP value measured for a candidate channel of the one or more candidate channels with the reference RSRP value; and terminate the measurement procedure and encode the RSRP value measured for the candidate channel to be reported from the UE to the AN, when a margin between the RSRP value measured for the candidate channel and the reference RSRP value is less than a predefined RSRP margin threshold.

Example 10 includes the apparatus of example 9, wherein when no reference RSRP value is available to the UE or a margin between each measured RSRP value and the reference RSRP value is larger than the predefined RSRP margin threshold, the processor is further configured to: measure RSRP values for all candidate channels between the UE and the AN and encode a highest RSRP value among the measured RSRP values, wherein the encoded highest RSRP value is reported from the UE to the AN.

Example 11 includes the apparatus of example 9, wherein when there are no any previous RSRP measurements on the UE, the processor is further configured to: measure RSRP values for all candidate channels between the UE and the AN; determine a highest RSRP value among the measured RSRP values; encode the highest RSRP value to be reported from the UE to the AN; and set the determined highest RSRP value to be the reference RSRP value.

Example 12 includes the apparatus of example 9, wherein when there is a previous RSRP measurement and report on the UE, the processor is further configured to: determine a RSRP value previously reported from the UE to the AN as the reference RSRP value.

Example 13 includes the apparatus of example 9, wherein when there is a previous RSRP measurement and report on the UE, the processor is further configured to: determine a latest RSRP value reported from the UE to the AN; and update the reference RSRP value to be the latest RSRP value reported from the UE.

Example 14 includes the apparatus of example 9, wherein the RSRP value is measured based on a Reference Signal (RS) including a Synchronization Signal (SS), a SS together with a Physical Broadcasting Channel (PBCH), a Channel State Information Reference Signal (CSI-RS) or a Demodulation Reference Signal (DM-RS).

Example 15 includes a method performed at User Equipment (UE), including: initiating a measurement procedure to measure a RSRP value for each of one or more candidate channels between the UE and an Access Node (AN), wherein each candidate channel corresponds to a respective Receive (RX) beam from the UE; comparing the RSRP value measured for a candidate channel of the one or more candidate channels with a predetermined RSRP threshold; and terminating the measurement procedure and reporting the RSRP value measured for the candidate channel to the AN, when the RSRP value measured for the candidate channel is higher than the predetermined RSRP threshold.

Example 16 includes the method of example 15, further including: measuring RSRP values for all candidate channels between the UE and the AN and reporting a highest RSRP value among the measured RSRP values to the AN, when no predetermined RSRP threshold is available to the UE or no RSRP value is higher than the predetermined RSRP threshold.

Example 17 includes the method of example 15, wherein the predetermined RSRP threshold is signaled to the UE from the AN, or predefined to be known by the UE.

Example 18 includes the method of example 15, further including: determining a reference RSRP value for the measurement procedure; and obtaining the predetermined RSRP threshold by subtracting a predefined RSRP margin threshold from the reference RSRP value.

Example 19 includes the method of example 18, wherein when there are no any previous RSRP measurements on the UE, the method further includes: measuring RSRP values for all candidate channels between the UE and the AN; determining a highest RSRP value among the measured RSRP values; reporting the highest RSRP value to the AN; and setting the determined highest RSRP value to be the reference RSRP value.

Example 20 includes the method of example 18, wherein when there is a previous RSRP measurement and report on the UE, the method further includes: determining a RSRP value previously reported from the UE to the AN as the reference RSRP value.

Example 21 includes the method of example 18, wherein when there is a previous RSRP measurement and report on the UE, the method further includes: determining a latest RSRP value reported from the UE to the AN; and updating the reference RSRP value to be the latest RSRP value reported from the UE.

Example 22 includes the method of example 15, wherein the RSRP value is measured based on a Reference Signal (RS) including a Synchronization Signal (SS), a SS together with a Physical Broadcasting Channel (PBCH), a Channel State Information Reference Signal (CSI-RS) or a Demodulation Reference Signal (DM-RS).

Example 23 includes a method performed at User Equipment (UE), including: initiating a measurement procedure to measure a RSRP value for each of one or more candidate channels between the UE and an Access Node (AN), wherein each candidate channel corresponds to a respective Receive (RX) beam from the UE; comparing the RSRP value measured for a candidate channel of the one or more candidate channels with a reference RSRP value; and terminating the measurement procedure and reporting the RSRP value measured for the candidate channel to the AN, when a margin between the RSRP value measured for the candidate channel and the reference RSRP value is less than a predefined RSRP margin threshold.

Example 24 includes the method of example 23, further including: measuring RSRP values for all candidate channels between the UE and the AN and reporting a highest RSRP value among the measured RSRP values to the AN, when no reference RSRP value is available to the UE or a margin between each measured RSRP value and the reference RSRP value is larger than the predefined RSRP margin threshold.

Example 25 includes the method of example 23, wherein when there are no any previous RSRP measurements on the UE, the method further includes: measuring RSRP values for all candidate channels between the UE and the AN; determining a highest RSRP value among the measured RSRP values; reporting the highest RSRP value to the AN; and setting the determined highest RSRP value to be the reference RSRP value.

Example 26 includes the method of example 23, wherein when there is a previous RSRP measurement and report on the UE, the method further includes: determining a RSRP value previously reported from the UE to the AN as the reference RSRP value.

Example 27 includes the method of example 23, wherein when there is a previous RSRP measurement and report on the UE, the method further includes: determining a latest RSRP value reported from the UE to the AN; and updating the reference RSRP value to be the latest RSRP value reported from the UE.

Example 28 includes the method of example 23, wherein the RSRP value is measured based on a Reference Signal (RS) including a Synchronization Signal (SS), a SS together with a Physical Broadcasting Channel (PBCH), a Channel State Information Reference Signal (CSI-RS) or a Demodulation Reference Signal (DM-RS).

Example 29 includes a computer-readable medium having instructions stored thereon, wherein the instructions, when executed by one or more processor(s) of User Equipment (UE), cause the processor(s) to perform the method of any of examples 15-28.

Example 30 includes an apparatus for User Equipment (UE) including means for performing the actions of the method of any of examples 15-28.

Example 31 includes an apparatus for User Equipment (UE), including a radio frequency (RF) interface configured to provide a set of slots received from an Access Node (AN); and a processor coupled with the RF interface and configured to: receive the set of slots from the RF interface; detect whether a slot or a slot pair of the set of slots includes one or more Synchronization Signal/Physical Broadcast Channel (SS/PBCH) blocks transmitted by the AN; and determine a predefined number of symbols at a beginning of the slot or the slot pair as symbols dedicated to downlink (DL) transmission, when it is detected that the slot or the slot pair includes the one or more SS/PBCH blocks.

Example 32 includes the apparatus of example 31, wherein the processor is further configured to: perform a DL measurement on the predefined number of symbols.

Example 33 includes the apparatus of example 31, wherein the processor is further configured to: determine a Subcarrier Spacing (SCS) corresponding to the slot including the one or more SS/PBCH blocks; and determine the predefined number of symbols dedicated to the DL transmission, based on the determined SCS.

Example 34 includes the apparatus of example 33, wherein when the SCS is 15 kHz, 30 kHz, or 120 kHz, the slot includes 14 symbols, the predefined number is 1 or 2 and the predefined number of symbols at the beginning of the slot are determined as the symbols dedicated to DL transmission.

Example 35 includes the apparatus of example 33, wherein when the SCS is 240 kHz, the slot pair includes 28 symbols, the predefined number is 1, 2, 3 or 4 and the predefined number of symbols at the beginning of the slot pair are determined as the symbols dedicated to DL transmission.

Example 36 includes the apparatus of example 31, wherein the processor is further configured to: decode a DL control channel transmitted by an Access Node (AN) on the predefined number of symbols, wherein the DL control channel is configured to indicate a DL data channel carrying Remaining Minimal System Information (RMSI) associated with the one or more SS/PBCH blocks.

Example 37 includes the apparatus of example 31, wherein the processor is further configured to: determine the predefined number of symbols according to a predefined correspondence between indexes of the predefined number of symbols and indexes of the one or more SS/PBCH blocks.

Example 38 includes an apparatus for an Access Node (AN), including: a radio frequency (RF) interface; and a processor coupled with the RF interface and configured to: detect whether a slot or a slot pair includes one or more Synchronization Signal/Physical Broadcast Channel (SS/PBCH) blocks transmitted by the AN; determine a predefined number of symbols at a beginning of the slot or the slot pair as symbols dedicated to downlink (DL) transmission, when it is detected that the slot or the slot pair includes the one or more SS/PBCH blocks; encode a notification about the predefined number of symbols dedicated to DL transmission; and send the encoded notification to the RF interface for transmission to User Equipment (UE) for allowing the UE to perform a DL measurement on the predefined number of symbols.

Example 39 includes the apparatus of example 38, wherein the processor is further configured to: determine a Subcarrier Spacing (SCS) corresponding to the slot including the one or more candidate SS/PBCH blocks; and determine the predefined number of symbols dedicated to the DL transmission, based on the determined SCS.

Example 40 includes the apparatus of example 39, wherein when the SCS is 15 kHz, 30 kHz, or 120 kHz, the slot includes 14 symbols, the predefined number is 1 or 2 and the predefined number of symbols at the beginning of the slot are determined as the symbols dedicated to DL transmission.

Example 41 includes the apparatus of example 39, wherein when the SCS is 240 kHz, the slot pair includes 28 symbols, the predefined number is 1, 2, 3 or 4 and the predefined number of symbols at the beginning of the slot pair are determined as the symbols dedicated to DL transmission.

Example 42 includes the apparatus of example 38, wherein the processor is further configured to: encode a DL control channel to be transmitted to the UE on the predefined number of symbols, wherein the DL control channel is configured to indicate a DL data channel carrying Remaining Minimal System Information (RMSI) associated with the one or more SS/PBCH blocks.

Example 43 includes the apparatus of example 38, wherein the processor is further configured to: determine the predefined number of symbols according to a predefined correspondence between indexes of the predefined number of symbols and indexes of the one or more SS/PBCH blocks.

Example 44 includes a method performed at User Equipment (UE), including: detecting whether a slot or a slot pair includes one or more Synchronization Signal/Physical Broadcast Channel (SS/PBCH) blocks transmitted by an Access Node (AN); and determining a predefined number of symbols at a beginning of the slot or the slot pair as symbols dedicated to downlink (DL) transmission, when it is detected that the slot or the slot pair includes the one or more SS/PBCH blocks.

Example 45 includes the method of example 44, further including performing a DL measurement on the predefined number of symbols.

Example 46 includes the method of example 44, further including: determining a Subcarrier Spacing (SCS) corresponding to the slot including the one or more SS/PBCH blocks; and determining the predefined number of symbols dedicated to the DL transmission, based on the determined SCS.

Example 47 includes the method of example 46, wherein when the SCS is 15 kHz, 30 kHz, or 120 kHz, the slot includes 14 symbols, the predefined number is 1 or 2 and the predefined number of symbols at the beginning of the slot are determined as the symbols dedicated to DL transmission.

Example 48 includes the method of example 46, wherein when the SCS is 240 kHz, the slot pair includes 28 symbols, the predefined number is 1, 2, 3 or 4 and the predefined number of symbols at the beginning of the slot pair are determined as the symbols dedicated to DL transmission.

Example 49 includes the method of example 44, further including: decoding a DL control channel transmitted by an Access Node (AN) on the predefined number of symbols, wherein the DL control channel is configured to indicate a DL data channel carrying Remaining Minimal System Information (RMSI) associated with the one or more SS/PBCH blocks.

Example 50 includes the method of example 44, further including: determining the predefined number of symbols according to a predefined correspondence between indexes of the predefined number of symbols and indexes of the one or more SS/PBCH blocks.

Example 51 includes a method performed at an Access Node (AN), including: detecting whether a slot or a slot pair includes one or more Synchronization Signal/Physical Broadcast Channel (SS/PBCH) blocks transmitted by the AN; and determining a predefined number of symbols at a beginning of the slot or the slot pair as symbols dedicated to downlink (DL) transmission, when it is detected that the slot or the slot pair includes the one or more SS/PBCH blocks, and notifying User Equipment (UE) about the predefined number of symbols dedicated to DL transmission to allow the UE to perform a DL measurement on the predefined number of symbols.

Example 52 includes the method of example 51, further including: determining a Subcarrier Spacing (SCS) corresponding to the slot including the one or more SS/PBCH blocks; and determining the predefined number of symbols dedicated to the DL transmission, based on the determined SCS.

Example 53 includes the method of example 52, wherein when the SCS is 15 kHz, 30 kHz, or 120 kHz, the slot includes 14 symbols, the predefined number is 1 or 2 and the predefined number of symbols at the beginning of the slot are determined as the symbols dedicated to DL transmission.

Example 54 includes the method of example 52, wherein when the SCS is 240 kHz, the slot pair includes 28 symbols, the predefined number is 1, 2, 3 or 4 and the predefined number of symbols at the beginning of the slot pair are determined as the symbols dedicated to DL transmission.

Example 55 includes the method of example 51, further including: encoding a DL control channel to be transmitted to the UE on the predefined number of symbols, wherein the DL control channel is configured to indicate a DL data channel carrying Remaining Minimal System Information (RMSI) associated with the one or more SS/PBCH blocks.

Example 56 includes the method of example 51, further including: determining the predefined number of symbols according to a predefined correspondence between indexes of the predefined number of symbols and indexes of the one or more SS/PBCH blocks.

Example 57 includes a computer-readable medium having instructions stored thereon, wherein the instructions, when executed by one or more processor(s) of User Equipment (UE), cause the processor(s) to perform the method of any of examples 44-50.

Example 58 includes an apparatus for User Equipment (UE) including means for performing the actions of the method of any of examples 44-50.

Example 59 includes a computer-readable medium having instructions stored thereon, wherein the instructions, when executed by one or more processor(s) of an Access Node (AN), cause the processor(s) to perform the method of any of examples 51-56.

Example 60 includes an apparatus for an Access Node (AN) including means for performing the actions of the method of any of examples 51-56.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the appended claims and the equivalents thereof.

What is claimed is:

1. An apparatus for User Equipment (UE), comprising:
a memory interface configured to receive a predetermined Reference Signal Received Power (RSRP) threshold from a memory; and
a processor coupled with the memory interface and configured to:
initiate a measurement procedure to measure a RSRP value for each of one or more candidate channels between the UE and an Access Node (AN), wherein each candidate channel corresponds to a respective Receive (RX) beam from the UE;
compare the RSRP value measured for a candidate channel of the one or more candidate channels with the predetermined RSRP threshold in a sequential manner, wherein RSRP values of the candidate channels are measured and compared with the predetermined RSRP threshold until a candidate channel is identified that has an RSRP value higher than the predetermined RSRP threshold;

terminate the measurement procedure when the candidate channel is identified and refrain from performing measurements on candidate channels that have not yet been measured; and encode the RSRP value measured for the identified candidate channel to be reported from the UE to the AN.

2. An apparatus for User Equipment (UE), comprising:

a memory interface configured to receive a predetermined Reference Signal Received Power (RSRP) threshold from a memory; and a processor coupled with the memory interface and configured to:

initiate a measurement procedure to measure a RSRP value for each of one or more candidate channels between the UE and an Access Node (AN), wherein each candidate channel corresponds to a respective Receive (RX) beam from the UE;

compare the RSRP value measured for a candidate channel of the one or more candidate channels with the predetermined RSRP threshold; and terminate the measurement procedure and encode the RSRP value measured for the candidate channel to be reported from the UE to the AN, when the RSRP value measured for the candidate channel is higher than the predetermined RSRP threshold, wherein when no predetermined RSRP threshold is available to the UE or no RSRP value is higher than the predetermined RSRP threshold, the processor is further configured to:

measure RSRP values for all candidate channels between the UE and the AN and encode a highest RSRP value among the measured RSRP values, wherein the encoded highest RSRP value is reported from the UE to the AN.

3. The apparatus of claim 2, wherein the predetermined RSRP threshold is signaled to the UE from the AN, or predefined to be known by the UE.

4. An apparatus for User Equipment (UE), comprising:

a memory interface configured to receive a predetermined Reference Signal Received Power (RSRP) threshold from a memory; and a processor coupled with the memory interface and configured to:

initiate a measurement procedure to measure a RSRP value for each of one or more candidate channels between the UE and an Access Node (AN), wherein each candidate channel corresponds to a respective Receive (RX) beam from the UE;

compare the RSRP value measured for a candidate channel of the one or more candidate channels with the predetermined RSRP threshold;

terminate the measurement procedure and encode the RSRP value measured for the candidate channel to be reported from the UE to the AN, when the RSRP value measured for the candidate channel is higher than the predetermined RSRP threshold;

determine a reference RSRP value for the measurement procedure; and obtain the predetermined RSRP threshold by subtracting a predefined RSRP margin threshold from the reference RSRP value.

5. The apparatus of claim 4, wherein when there are no any previous RSRP measurements on the UE, the processor is further configured to:

measure RSRP values for all candidate channels between the UE and the AN;

determine a highest RSRP value among the measured RSRP values;

encode the highest RSRP value to be reported from the UE to the AN; and set the determined highest RSRP value to be the reference RSRP value.

6. The apparatus of claim 4, wherein when there is a previous RSRP measurement and report on the UE, the processor is further configured to:

determine a RSRP value previously reported from the UE to the AN as the reference RSRP value.

7. The apparatus of claim 4, wherein when there is a previous RSRP measurement and report on the UE, the processor is further configured to:

determine a latest RSRP value reported from the UE to the AN; and update the reference RSRP value to be the latest RSRP value reported from the UE.

8. The apparatus of claim 4, wherein the RSRP value is measured based on a Reference Signal (RS) comprising a Synchronization Signal (SS), a SS together with a Physical Broadcasting Channel (PBCH), a Channel State Information Reference Signal (CSI-RS) or a Demodulation Reference Signal (DM-RS).

* * * * *